(12) United States Patent
Tiruvur et al.

(10) Patent No.: US 10,009,200 B2
(45) Date of Patent: *Jun. 26, 2018

(54) DATA COMMUNICATION SYSTEMS WITH FORWARD ERROR CORRECTION

(71) Applicant: INPHI CORPORATION, Santa Clara, CA (US)

(72) Inventors: Arun Tiruvur, San Jose, CA (US); Jamal Riani, Fremont, CA (US); Sudeep Bhoja, San Jose, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/405,020

(22) Filed: Jan. 12, 2017

(65) Prior Publication Data

US 2017/0187555 A1    Jun. 29, 2017

Related U.S. Application Data

(63) Continuation of application No. 14/304,635, filed on Jun. 13, 2014, now Pat. No. 9,564,990.

(60) Provisional application No. 61/885,985, filed on Oct. 2, 2013.

(51) Int. Cl.
*H04L 27/04* (2006.01)
*H04L 1/00* (2006.01)

(52) U.S. Cl.
CPC ............ *H04L 27/04* (2013.01); *H04L 1/0042* (2013.01)

(58) Field of Classification Search
CPC ..... H04L 1/0042; H04L 1/004; H04L 1/0057; H04L 2025/03547; H04L 27/04; H04L 25/026; H04L 25/03006; H04L 25/03343; H04L 47/32; H04B 10/272; H04B 10/40; H04B 10/541
See application file for complete search history.

(56) References Cited

U.S. PATENT DOCUMENTS

| | | | |
|---|---|---|---|
| 6,782,511 B1 * | 8/2004 | Frank .................. | G06F 17/5045 716/102 |
| 7,873,892 B2 * | 1/2011 | Ganga .................. | H03M 13/33 714/752 |
| 8,984,380 B2 * | 3/2015 | Vijayaraghavan .. | H03M 13/353 370/445 |
| 9,240,907 B2 * | 1/2016 | Wang ...................... | H04L 25/02 |
| 2007/0157060 A1 * | 7/2007 | Ganga .................. | H03M 13/33 714/752 |
| 2010/0293441 A1 * | 11/2010 | Booth ................. | H03M 13/333 714/776 |

* cited by examiner

*Primary Examiner* — Phung M Chung

(74) *Attorney, Agent, or Firm* — Richard T. Ogawa; Ogawa P.C.

(57) ABSTRACT

Embodiments of the present invention include an apparatus that receives date from multiple lanes, which are then aligned and synchronized for transcoding and encoding.

20 Claims, 22 Drawing Sheets

100G Alignment Marker Mapping

| FEC Lane | 0 | 127 | 0 | 128 | 0 | 127 | 0 | 128 | 0 | 127 | 0 | 128 | 0 | 127 | 0 | 77 |
|---|---|---|---|---|---|---|---|---|---|---|---|---|---|---|---|---|
| 0 | am_tx_0 | am_tx_2 | am_tx_4 | am_tx_6<br>P1 | am_tx_8 | am_tx_10 | am_tx_12 | am_tx_14<br>P3 | am_tx_16 | am_tx_18 | fec_prty_0<br>D0 |
| | 0 | 128 | 0 | 127 | 0 | 128 | 0 | 127 | 0 | 128 | 0 | 127 | 0 | 128 | 0 | 76 |
| 1 | am_tx_1<br>P0 | am_tx_3 | am_tx_5 | am_tx_7 | am_tx_9 | am_tx_11<br>P2 | am_tx_13 | am_tx_15 | am_tx_17 | am_tx_19<br>P4 | fec_prty_1 |

Figure 11

40G Alignment Marker Mapping

| FEC Lane | 0 | | 127 | 0 | | 128 |
|---|---|---|---|---|---|---|
| 0 | am_tx_0 | am_tx_1 | | am_tx_2 | am_tx_3 P0 | |

Figure 13

100G Codeword Mapping

| AM | 16384 x 5 x 257 bits | AM | 16384 x 5 x 257 bits |
|---|---|---|---|
| 16384 x 1285 | | 16384 x 1285 | |

Figure 14

DATA COMMUNICATION SYSTEMS WITH FORWARD ERROR CORRECTION

CROSS-REFERENCES TO RELATED APPLICATIONS

This patent application is a continuation of and claims priority to U.S. Pat. No. 9,564,990 issued on Feb. 7, 2017, which claims priority to U.S. Provisional Patent Application No. 61/885,985, filed 2 Oct. 2013, entitled "PAM DATA COMMUNICATION WITH FORWARD ERROR CORRECTION", which are incorporated by reference herein for all purposes.

This patent application is related to U.S. patent application Ser. No. 13/791,201, filed 8 Mar. 2013, titled "OPTICAL COMMUNICATION INTERFACE UTILIZING CODED PULSE AMPLITUDE MODULATION" and now granted as U.S. Pat. No. 9,020,346, issued Apr. 28, 2015, which claims priority from U.S. Provisional Patent Application No. 61/714,543, filed 16 Oct. 2012, titled "100 G PA CODED MODULATION", and U.S. Provisional Patent Application No. 61/699,724, titled "ADAPTIVE ECC FOR FLASH MEMORY", all of which are incorporated by reference herein for all purposes.

BACKGROUND OF THE INVENTION

The present invention is directed to data communication systems and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication systems and methods. More specifically, embodiments of the present invention provide an apparatus that receives data from multiple lanes, which are then synchronized for transcoding and encoding. There are other embodiments as well.

According to an embodiment, the present invention provides an apparatus for encoding and decoding 25 Gigabit (25 G), 40 Gigabit (40 G), 50 Gigabit (50 G), or 100 Gigabit (100 G) signals in a communication network. The apparatus includes a plurality of lanes configured for 25 G, 40 G, or 100 G. The apparatus includes a pseudo random bit sequence checker coupled to each of the plurality of lanes, which is configured to a first clock signal A. Additionally, the apparatus includes a plurality of skew compensator modules. Each of the skew compensator modules is coupled to at least one of the plurality of lanes. The skew-compensator modules are configured to synchronize data from the plurality of lanes. The apparatus additionally includes a plurality of de-skew FIFO modules. Each of the de-skew compensator modules is coupled to at least one of the plurality of skew compensator modules.

A first bus is coupled to an output of each of the de-skew compensator modules. A clock rate converter device is coupled to the output of first bus, and is configured to a second clock signal B. A second bus coupled to the output of the clock rate converter module. According to an embodiment, the operation of the de-skew compensator modules and the de-skew FIFO modules are controlled by a control module. For example, the control modules comprises state machines for the de-skew compensator modules and the de-skew FIFO modules.

The apparatus additionally includes a transcoder module coupled to an output of the second bus, and is configured to a third clock rate C. A third bus is coupled to an output of the transcoder module. The apparatus includes a forward error correction encoder module coupled to an output of the third bus, and is configured to the third clock signal C. A plurality of bus lanes is coupled to an output of the FEC encoder module. A pre-coder module is coupled to the plurality of bus lanes from the FEC encoder module. A plurality of gear box modules is coupled to the plurality of bus lanes. Each of the plurality of gear box modules is coupled to a pattern generator module. A first MUX device is coupled to a first output of a first gear box module out of a plurality of gear box modules. A second MUX device is coupled to a second output of the second gear box module out of the plurality of gear box modules. A first gray mapping PAM encoding module is coupled to an output of the first MUX device. A second gray mapping PAM encoding module is coupled to an output of the second MUX device.

There are other embodiments as well.

BRIEF DESCRIPTION OF THE DRAWINGS

FIGS. 10-15 are simplified diagram illustrating mapping alignment markers.

DETAILED DESCRIPTION OF THE INVENTION

Figure 1:
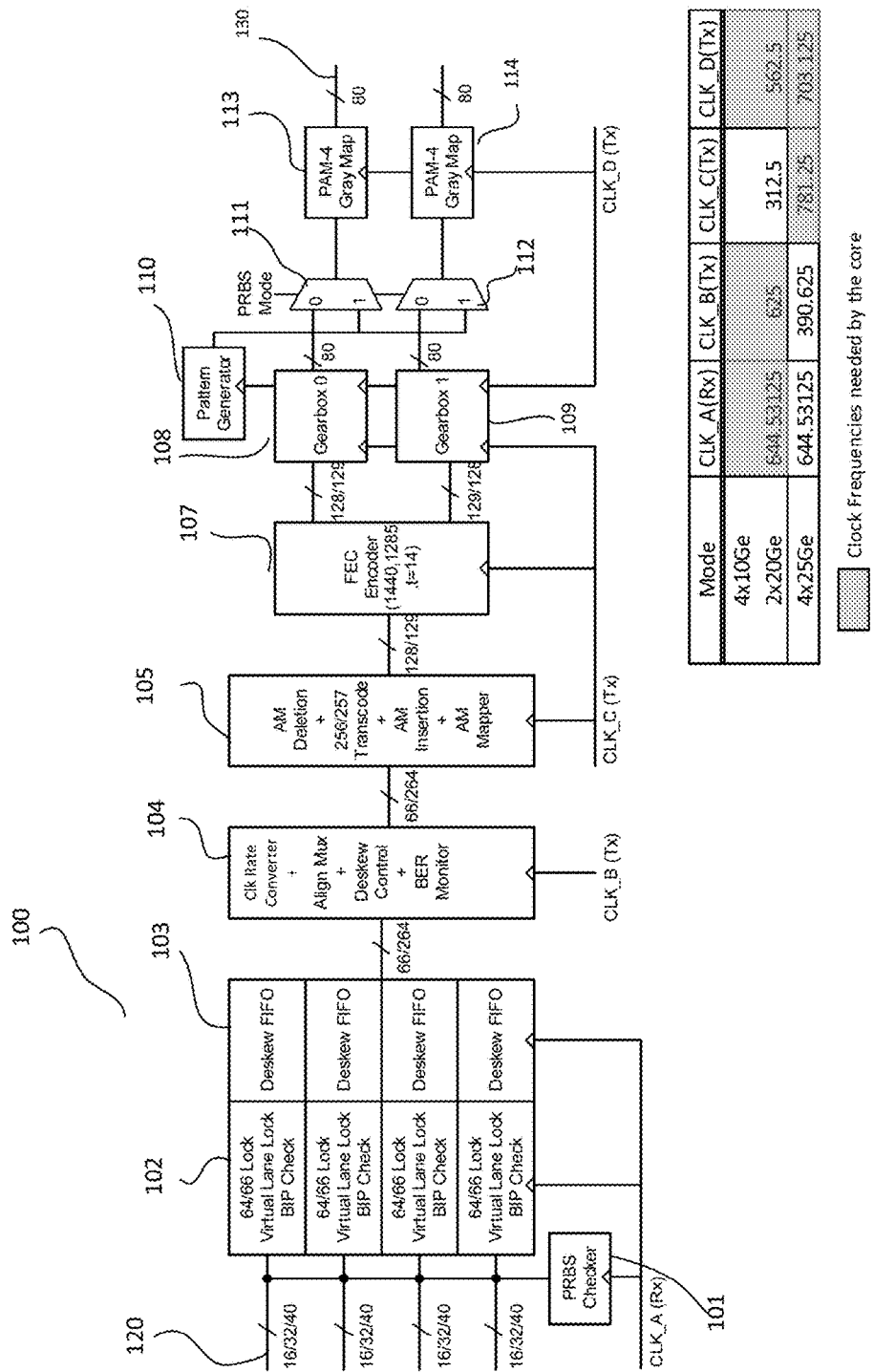
FIG. 1 is a simplified diagram illustrating a communication apparatus according to an embodiment of the present invention.

The present invention is directed to data communication system and methods. More specifically, embodiments of the present invention provide an apparatus that receives date from multiple lanes, which are then synchronized for transcoding and encoding. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In various embodiments, the present invention provides a system for data communication at high speed. For example, the system can include a 40 G/100 G PAM Tx device, which is configured as a transmit IP. In various embodiments, the device is implemented with a CAUI-Rx (e.g., receiving communication interface) on the host side and Mach Zehnder Driver on the line side, 40 G/100 G PAM systems according to embodiments of the present invention provide a transmit solution that addresses both 40 G and 100 G rates for optical communication applications. In some specific embodiments, 40 G PAM4 for SMF cabling, 100 G PAM4 for SMF cabling, and other types of applications are supported.

In certain implementations, the following features are provided:
Line-side interface operating at
  22.5 Gbps using PAM4 signaling for a 40 Ge application or
  28.125 Gbps using PAM4 signaling for a 100 Ge application
Host-side interface operating at
  4×10.3125 Gbps for a 40 Ge application or
  2×20.625 Gbps for a 40 Ge application or
  4×25.78125 Gbps for a 100 Ge application
Protocol Locking
  Block Lock (64b/66b Sync Acquisition)
  Virtual Lane Lock (Alignment Marker Locking)
Data Alignment and Deskew FIFO
PCS Lane Re-ordering (Alignment Mux)
64b/66b (code-word) to 256b/257b Transcoder
BER Monitor
BIP Checking
BCH Encoder for 1e-15 output BER
PRBS Generation supporting PRBS-7,9,11,13,15,23,31
PRBS Verifiers with "Auto-PRBS lock"
Square wave and Custom Pattern Generation
Error Injection, Polarity inversion, Tx disable and Bit Swap
MDIO and I2C interface FIG. 1 is a simplified diagram illustrating a communication apparatus according to an embodiment of the present invention. This diagram is merely an example, which should not unduly limit the scope of the claims. One of ordinary skill in the art would recognize many variations, alternatives, and modifications. For example, the communication apparatus 100 may additionally include precoder module. In various embodiments, the communication apparatus is capable of multispeed PAM4 operation supporting 25 G, 40 G, and 100 G MAC. For example, the port (e.g., input lines) speed can be based on signal-to-noise (SNR) ratio measured by the apparatus. In various embodiments, SNR is monitored to ensure high performance. Depending on the implementation, different scales of optical and electrical interfaces can be utilized. For example, adaptive physical layer (PHY) can be used for link SNR monitoring to achieve the highest throughput possible for a given communication link. In various embodiments, universal physical layer, such as single-mode (SMF) and multimode (MMF) optical fibers can be supported. In addition, amplifier control for optical communication, such as transimpedance amplifier (TIA) control, can be integrated as a part of the digital signal processing (DSP) performed. In certain embodiments, the communication apparatus 100 can provide mechanics of aligning dual channels when BCH type forward error correction (FEC) is striped across dual lambdas for lower latency.

The communication apparatus 100 is configured to, among other things, encoding and decoding 40 G, 50G, and/or 100 G signals in a communication network. The communication device 100 has a plurality of input lines (e.g., including input line 120) for receiving data, which are to be processed. For example, the incoming data as shown can be 16 b, 32 b, or 40 b wide, and they are processed by the virtual lane lock modules that perform BIP check. In certain embodiments, the input lines as shown can have different formats. For example, the lines are configured for 25 G, 40 G, and/or 100 G. It is to be understood that other bandwidths and formats are possible as well.

The pseudo random bit sequence (PRBS) checker 101 is coupled to each of the plurality of lanes. The PRBS checker 101 is configured to use a first clock signal A as shown. For example, the PRBS checker is configured to check the following test patterns: PRBS-9, 7, 11, 13, 15, 23, and 31. In various embodiments, the PRBS checker 101 supports "Auto-PRBS lock" that allows for detecting reception of any supported PRBS.

Since data coming in from the input lines can have different data rates, skew compensation is provided to achieve block synchronization. For example, skew compensation can be achieved by a plurality of skew compensator modules, or virtual lane locks that perform BIP check. The virtual lane locks (e.g., including virtual lane lock 102) provide protocol locking, which is used to achieve block synchronization (block locking) and virtual lane lock, and to write the code-word to the alignment and deskew FIFO for the following types of frame. For example, for 40 GBase-R that uses 64b/66b encoding, four block synchronization modules are provided. Other considerations are possible, such as 4×10 G or 2×20 G. For 100 GBase-R that also uses 64b/66b encoding, twenty block synchronization modules are used. For example, various implementations may support one of the five modes (4×10 Ge, 2×20 Ge, 100 Ge, OTL3.4 or OTL4.4) at a time and the mode is configurable via MDIO.

Figure 2:
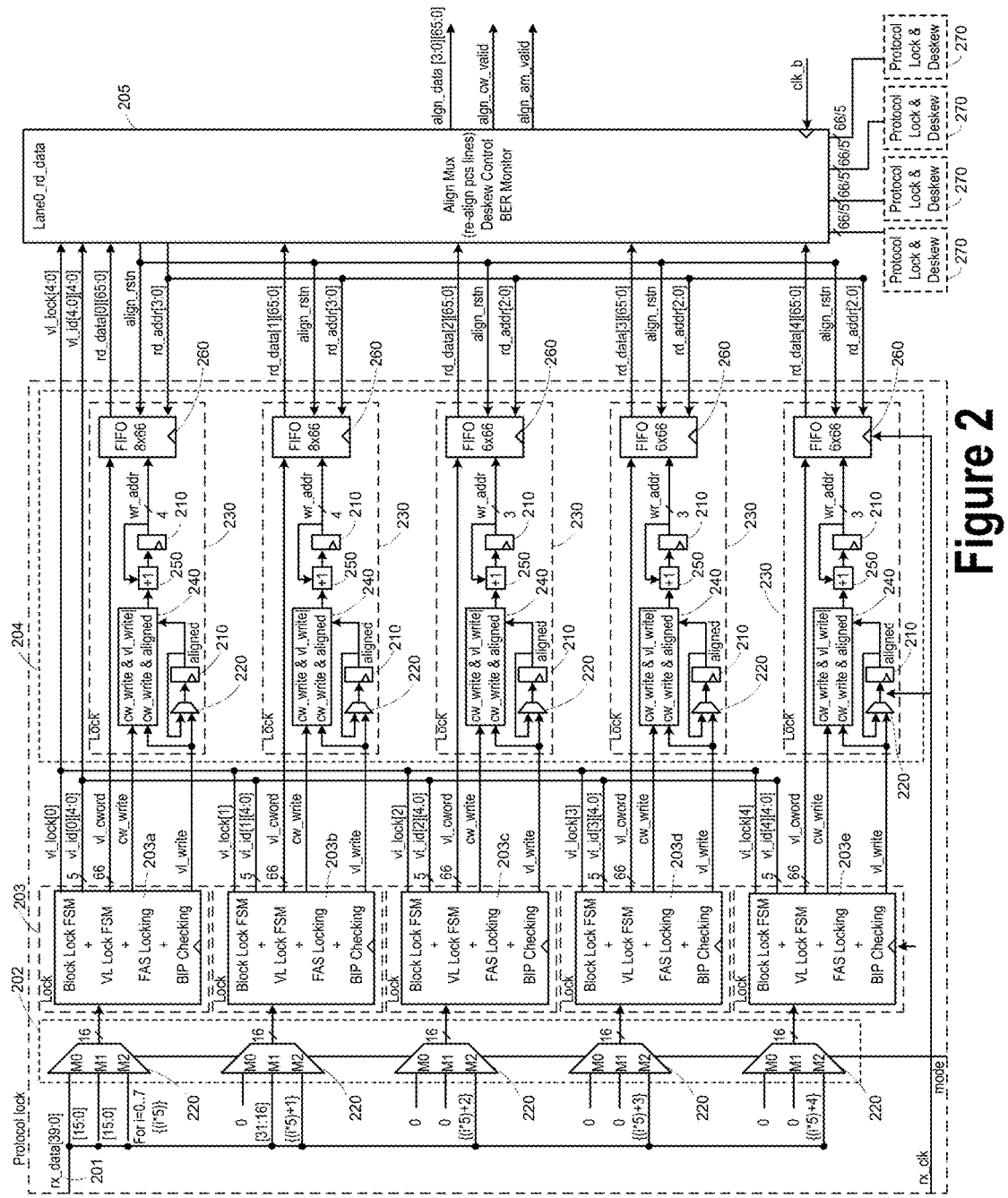
FIG. 2 is a simplified diagram illustrating a protocol lock module.

FIG. 2 is a simplified diagram illustrating a protocol locking module (or referred to as skew compensation module). This diagram is merely an example, which should not unduly limit the scope of the claims. One of ordinary skill in the art would recognize many variations, alternatives, and modifications. Depending on the mode of operation, the incoming data 201 can be 16 b, 32 b or 40 b wide. An input MUX selector 202 routes the appropriate bits to the block lock Finite State Machine (FSM) 203. Block lock FSM 203 is connected to deskew module 204, which is connected to the align mux module 205. For example, in the 4×10 G mode, only one of the Block Lock FSM is enabled (e.g., 203a); in 2×20 G mode two of the Block Lock FSM's are enabled (e.g., 203a and 203b); and in 1×100 G mode, all five (e.g., 203a-203d) of the Block Lock FSM's are enabled. FIG. 2 shows the details for one lane of the rx_data. Since four lanes are provided as shown in FIG. 1, the Protocol Lock Block 202 shown in FIG. 2 is replicated four times. Note that for 2×20 G mode, only the first two Block Locks from the first two Protocol Lock Blocks are enabled. FIG. 2 further illustrates a plurality of flip flops 210, a plurality of multiplexers 220, a plurality of deskew circuits 230, a plurality of block circuits 240, a plurality of inverters 250, a plurality of FIFO circuits 260, and a plurality of protocol lock & deskew circuits.

In the 40 G or 100 G Ethernet mode, the Block Lock FSM 203 looks for 64 consecutive sync headers to declare a block lock. For example, a valid sync header is either 'b10 or 'b01. Once block lock is achieved, it takes a count of 65 invalid sync headers in a 1024 sync window to declare a loss of block lock. To reduce switching power, a configurable mode is provided, where the search of valid sync headers is disabled once in the lock state, and enabled once an invalid sync header is observed.

Figure 3:
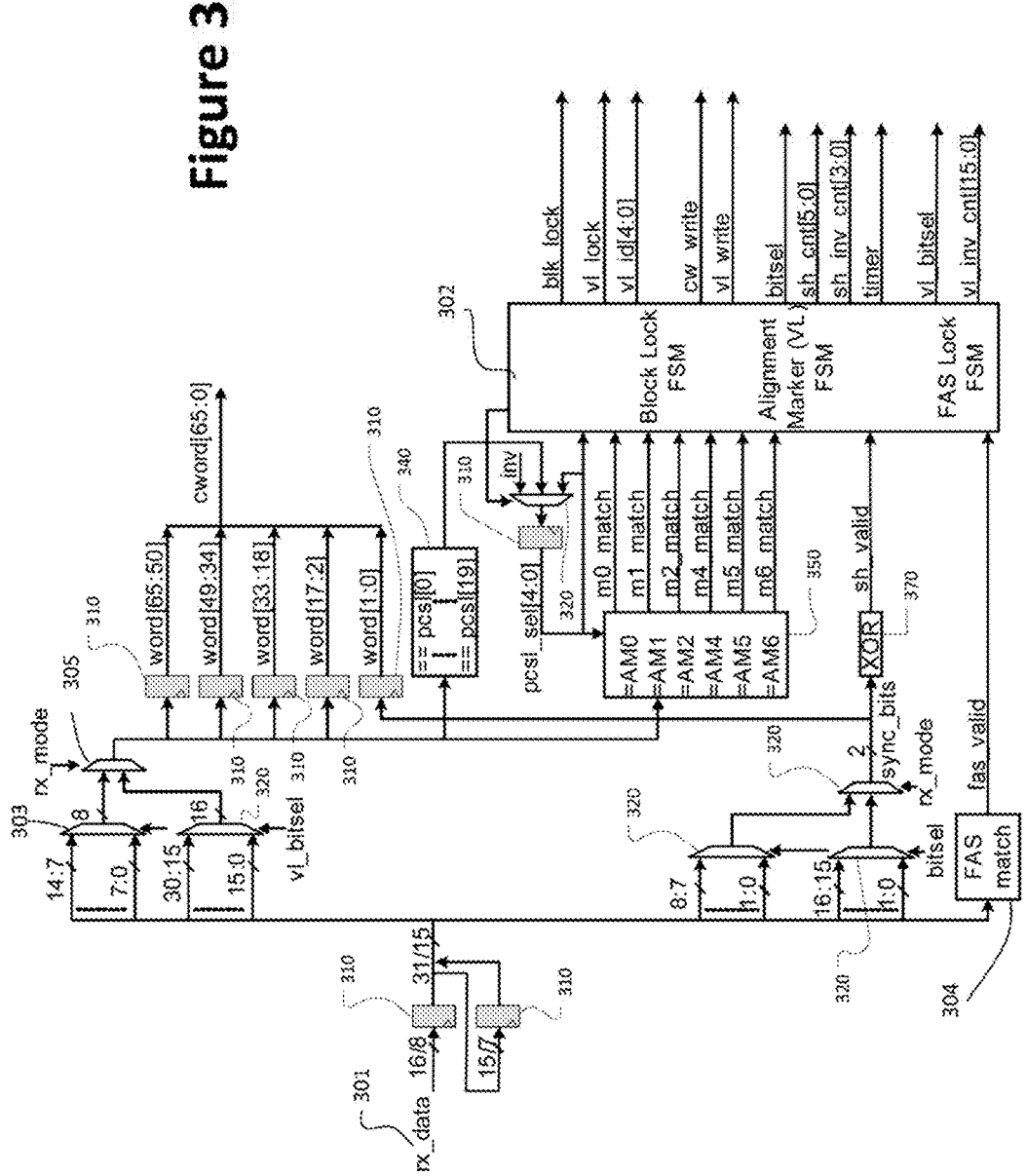
FIG. 3 is a simplified block diagram illustrating block locking mechanism according to embodiments of the present invention.
Figure 4:
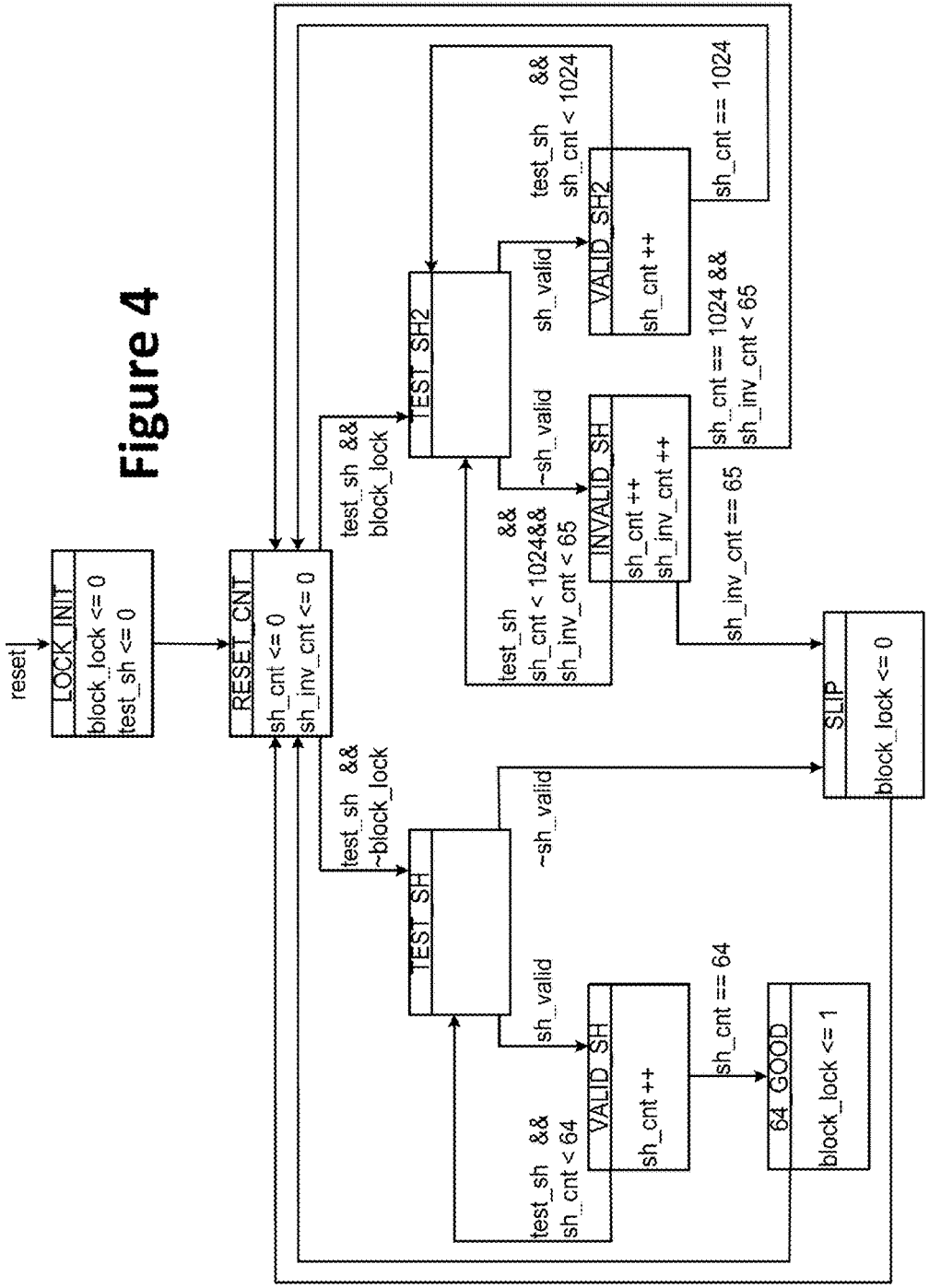
FIG. 4 is a simplified flow diagram illustrating operation of block locking operation according to an embodiment of the present invention.

For used in communication system, the block lock device complies with various communication standards. In an implementation, the block lock state machine adheres to Clause 82 of IEEE 8023, FIG. 82-10 of IEEE 802.3-2012. For example, the receive clocks (rx_clk [3:0]) from all lines needs to be frequency locked with transmit clock (clk_b), and there cannot be a ppm offset between them. The internals of the Block Lock FSM, Virtual Lane Lock FSM and Frame Alignment Signal Lock (used by OTL3.4 and OTL4.4) are shown in FIG. 3. FIG. 3 is a simplified block diagram illustrating block locking mechanism according to embodiments of the present invention. This diagram is merely an example, which should not unduly limit the scope of the claims. One of ordinary skill in the art would recognize many variations, alternatives, and modifications. For example, the block locking mechanism in FIG. 3 corresponds to lock block 202 in FIG. 2. Incoming data rx_data 301 is coupled to mux selectors (e.g., mux 303, mux 305, etc.), which are coupled to block 302 as shown. FIG. 3 further illustrates a plurality of flip flops 310, a plurality of multiplexers 320, block circuits 340 and 350, and an XOR gate 370. The operation of the block locking mechanism is illustrated in FIG. 4. FIG. 4 is a simplified flow diagram illustrating operation of block locking operation according to an embodiment of the present invention. This diagram is merely an example, which should not unduly limit the scope of the claims. One of ordinary skill in the art would recognize many variations, alternatives, and modifications. For example, various steps may be added, removed, repeated, rearranged, modified, and/or overlapped. Functional blocks in FIG. 4 are listed in Table 1 below:

TABLE 1

Block Lock FSM Description

| State | Description |
| --- | --- |
| LOCK_INIT | This is the default state of the Block lock FSM. State is entered on reset. |
| RESET_CNT | Reset both the valid and invalid sync header counts. The next state is TEST_SH, when the timer to look for sync header expires, which is indicated by test_sh and block is not locked. If the block is locked the next state is TEST_SH2. |
| TEST_SH | Check if the Sync header is valid or not. If valid, then go to VALID_SH else go to SLIP. |
| TEST_SH2 | Check if the Sync header is valid or not. If valid, then go to VALID_SH2 else go to INVALID_SH. |

TABLE 1-continued

Block Lock FSM Description

| State | Description |
|---|---|
| VALID_SH | Increment the Valid Sync header count by 1, which is indicated by sh_cnt. If the sh_cnt is 64, then go to 64_GOOD state, else if sh_cnt is less than 64 and test_sh is true, then go to TEST_SH. |
| 64_GOOD | Assert block_lock to be true. Next state is RESET_CNT |
| VALID_SH2 | Increment Valid Sync header counter by 1, which is indicated by sh_cnt. If sh_cnt is 1024, then go to RESET_CNT, else if sh_cnt is less than 1024 and test_sh is true then go to TEST_SH2. |
| INVALID_SH | Increment the sh_cnt and sh_inv_cnt. If sh_cnt is 1024 and sh_inv_cnt is less than 65, then go to RESET_CNT, else if sh_inv_cnt is 65, then go to SLIP, else if test_sh is true and sh_cnt is less than 1024 and sh_inv_cnt is less than 65, then go to TEST_SH. |
| SLIP | Assert block_lock to be false. Next state is RESET_CNT |

Figure 5:
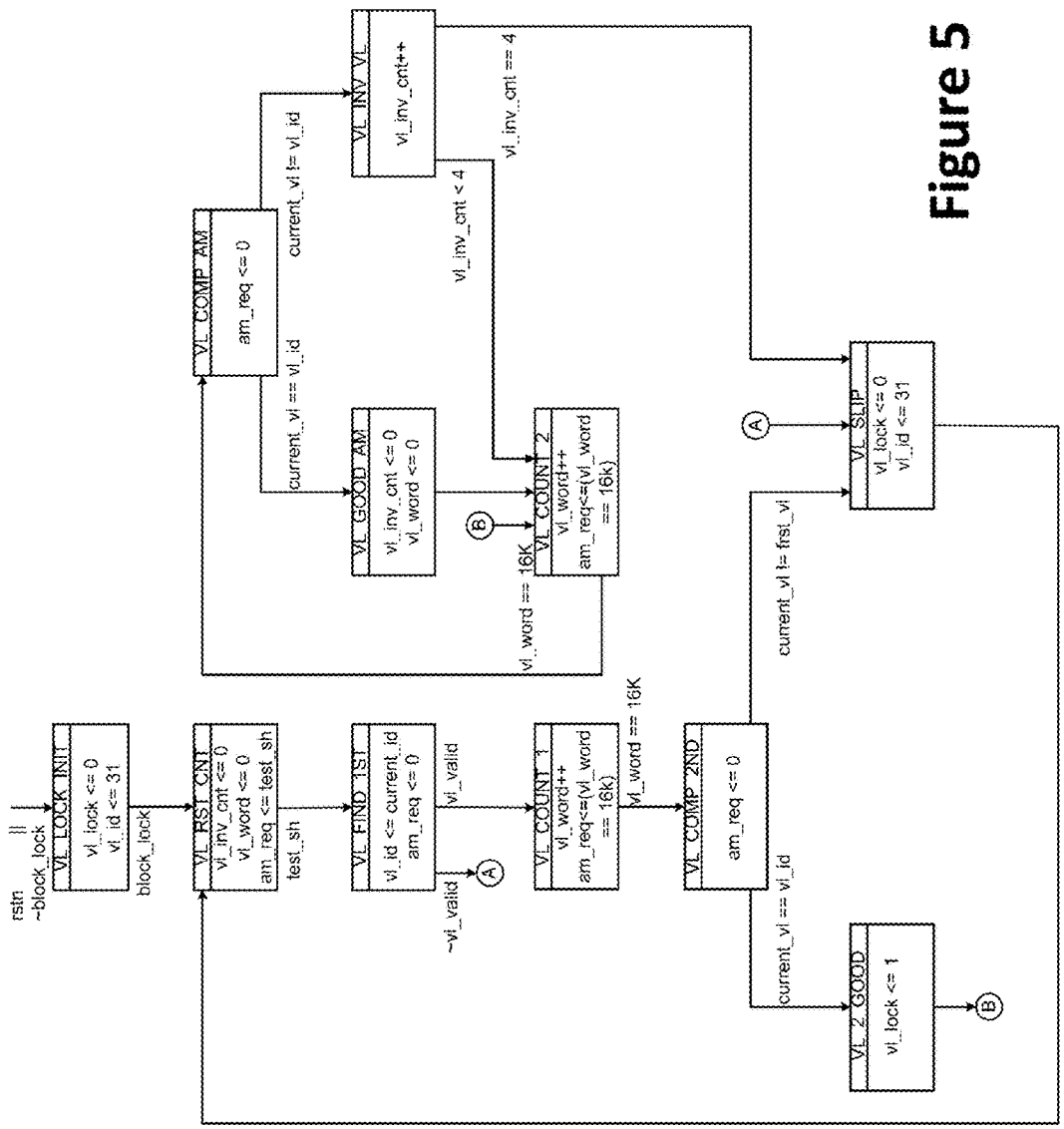
FIG. 5 is simplified diagram illustrating a virtual lane lock mechanism according to an embodiment of the present invention.

In addition to performing block lock, virtual lane lock can also be performed. More specifically, once block lock is achieved, the virtual lane lock FSM begins obtaining alignment marker lock to align data signal received from the four input lanes. In a specific implementation, the alignment marker is configured to be detected every 16383 code words (66b) on each Virtual Lane. Writing operation is performed to Deskew FIFO (e.g., block 103 in FIG. 1) for each virtual lane starting with second marker that matches the previous marker. For example, The Alignment Marker (Virtual Lane Lock) state machine as implemented uses the values from Table 82-2 from the 100 GBASE-R Alignment marker encoding, or Table 82-3 from the 40 GBASE-R alignment marker encoding. FIG. 5 is simplified diagram illustrating a virtual lane lock mechanism according to an embodiment of the present invention. This diagram is merely an example, which should not unduly limit the scope of the claims. One of ordinary skill in the art would recognize many variations, alternatives, and modifications. The virtual lane lock FSM is shown FIG. 5.

Figure 6:
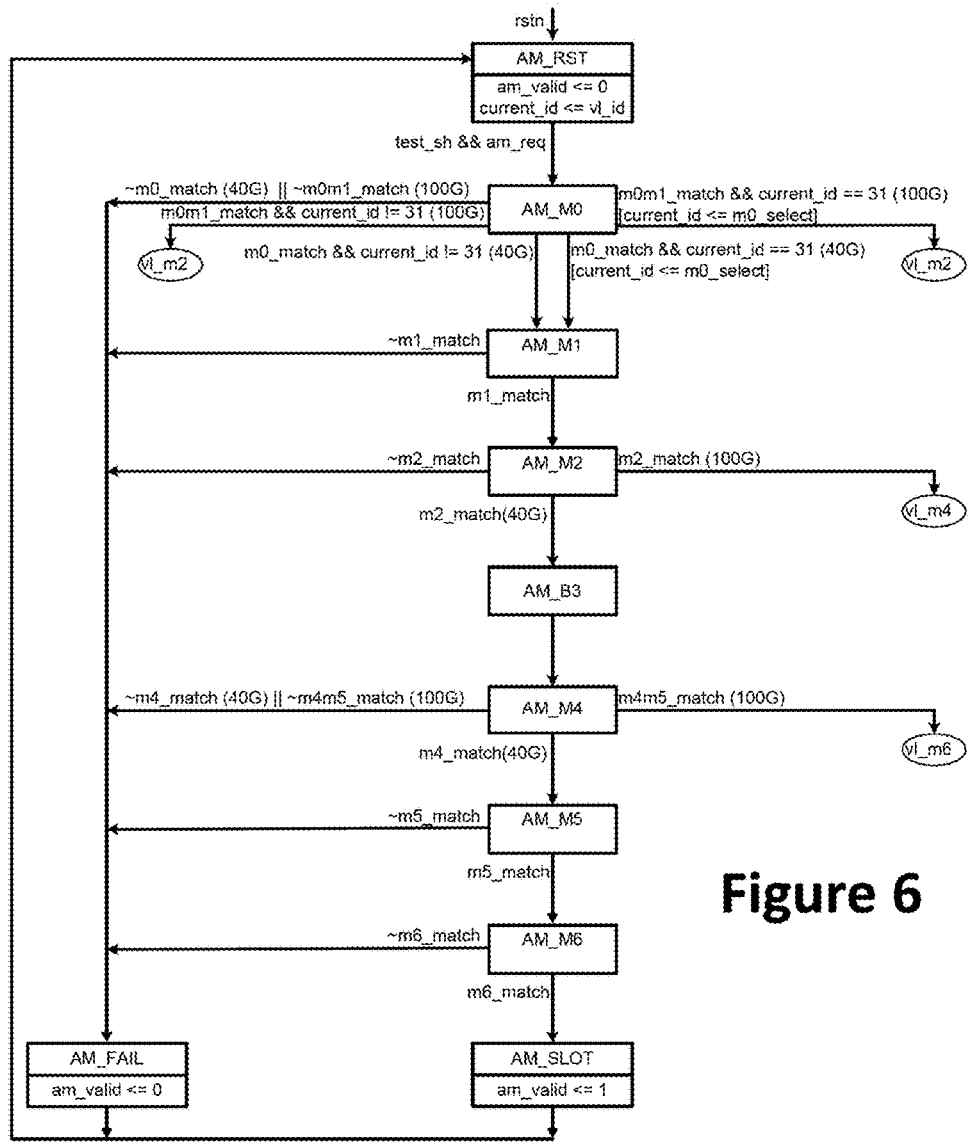
FIG. 6 is a simplified diagram illustrating alignment marker detection process according to an embodiment of the present invention.

FIG. 6 is a simplified diagram illustrating alignment marker detection process according to an embodiment of the present invention. This diagram is merely an example, which should not unduly limit the scope of the claims. One of ordinary skill in the art would recognize many variations, alternatives, and modifications. Among other features, code words are matched with expected marker. The states of the Alignment Marker Detection FSM are described in Table 2 below:

TABLE 2

Alignment Marker Detection FSM Description

| State | Description |
|---|---|
| VL_RST | Initialize Virtual Line Valid variable (vl_valid) to zero and load Current Virtual Line variable (current_vl) with Virtual ID (vl_id) variable. Virtual ID variable is initialized to "31" by reset, unlocked block or loosing Virtual Line locking. FSM remains on this state until test_sh and vl_req are asserted. Test_sh is asserted by Block Lock FSM and vl_req (Virtual Line Request) is asserted by Virtual Line Lock FSM. |
| VL_M0 | Once the block lock is achieved and Virtual Line Lock FSM requests finding the next marker, then M0 match is searched for 40Ge or M0 and M1 match for 100Ge. If m0_match for 40Ge, then go to VL_M1, else if M0 and M1_match for 100G2, then go to VL_M2, else go to VL_FAIL. |
| VL_M1 | Look for a M1 match. If m1_match, then go to VL_M2, else go to VL_FAIL. It is not possible to make it to this state for 100Ge mode. |
| VL_M2 | Look for a M2 match. If m2_match, then for 40Ge go to VL_B3 or go to VL_M4 for 100Ge, else go to VL_FAIL. |
| VL_B3 | Transition to VL_M4 state. It is not possible to make it to this state for 100Ge mode. |
| VL_M4 | Look for an m4_match for 40Ge or m4m5_match for 100Ge. If m4_match, then go to VL_M5, else if m4m5_match, then go to VL_M6, else go to VL_FAIL. |
| VL_M5 | Look for a M5 match. If m5_match, then go to VL_M6, else go to VL_FAIL. |
| VL_M6 | Look for a M6 match. If m6_match, then go to VL_SLOT, else go to VL_FAIL. |
| VL_SLOT | Set vl_valid to 1 and go to VL_RST. |
| VL_FAIL | Set vl_valid to 0 and go to VL_RST state. |

Now referring back to FIG. 1. As explained above, once the lanes are synchronized, de-skewing is performed. For example, de-skewing is performed by a plurality of de-skewing FIFO modules (e.g., block 103). The deskew FIFO modules are needed to account for the skew and skew variations across the physical lanes in 40 G mode and virtual and physical lanes in 100 G mode. Additionally, the FIFO accounts for the phase differences between the Rx clock from CAUI-RX and Tx clock. For example, the de-skew FIFO modules are implemented in accordance to communication standard(s), such as the IEEE 802.3ba-2012 standard, where the maximum skew and skew variation from Table 80-4 'Summary of skew constraints' and Table 80-5

'Summary of skew variation constraints' at the Tx PMD interface is described under Table 3 below:

TABLE 3

Skew Constraints

Summary of Skew Constraints

| Skew Points | Max Skew (ns) | Max skew for 40GBase-R (UI) | Max skew for 100GBase-R (UI) |
|---|---|---|---|
| SP2 | 43 | ≈443 | ≈222 |

Summary of Skew Variation constraints

| Skew Points | Max Skew Variation (ns) | Max skew variation for 10.3125GBd (UI) | Max skew for 25.78125GBd (UI) |
|---|---|---|---|
| SP2 | 0.4 | ≈4 | ≈10 |

The determination of the FIFO depth in the 4×10 G and 2×20 G mode is as follows:
  Max skew is 443 UI and Max skew variation is ±4 UI
  Sum of all differences is 443+4+66 (sync clk+read)=513 UI
For example, the FIFO operates on 66b word, and so the depth of the FIFO is 8 (513/66=7.78) per lane.
The determination of the FIFO depth in the 4×25 G mode is as follows:
  Max skew is 222 UI and Max skew variation is ±10 UI
  Sum of all differences is 222+10+66*2 (sync clk+read 264b)=364 UI
The FIFO operates on 66b word, and so the depth of the FIFO is be 6 (364/66=5.51) per lane.
In a 4×10 G mode, each lane has an 8-deep, 66b wide FIFO. In a 2×20 G mode, given only two lanes, each lane will have 8-deep, 66b wide FIFO. In a 4×25 G mode, each lane will have 5 6-deep, 66b wide FIFO. Combining the FIFO's for the above modes, of the 5 virtual lanes, VL0 and VL1 will have 8-deep, while VL2, VL3 and VL4 will have 6-deep each.

The wr_addr starts incrementing once both the block lock and virtual lane lock are true. The rd_addr increments is controlled through the de-skew state machine and is common to all the FIFO's lanes. The first code word from all FIFO's is the Alignment Marker.

Figure 7:
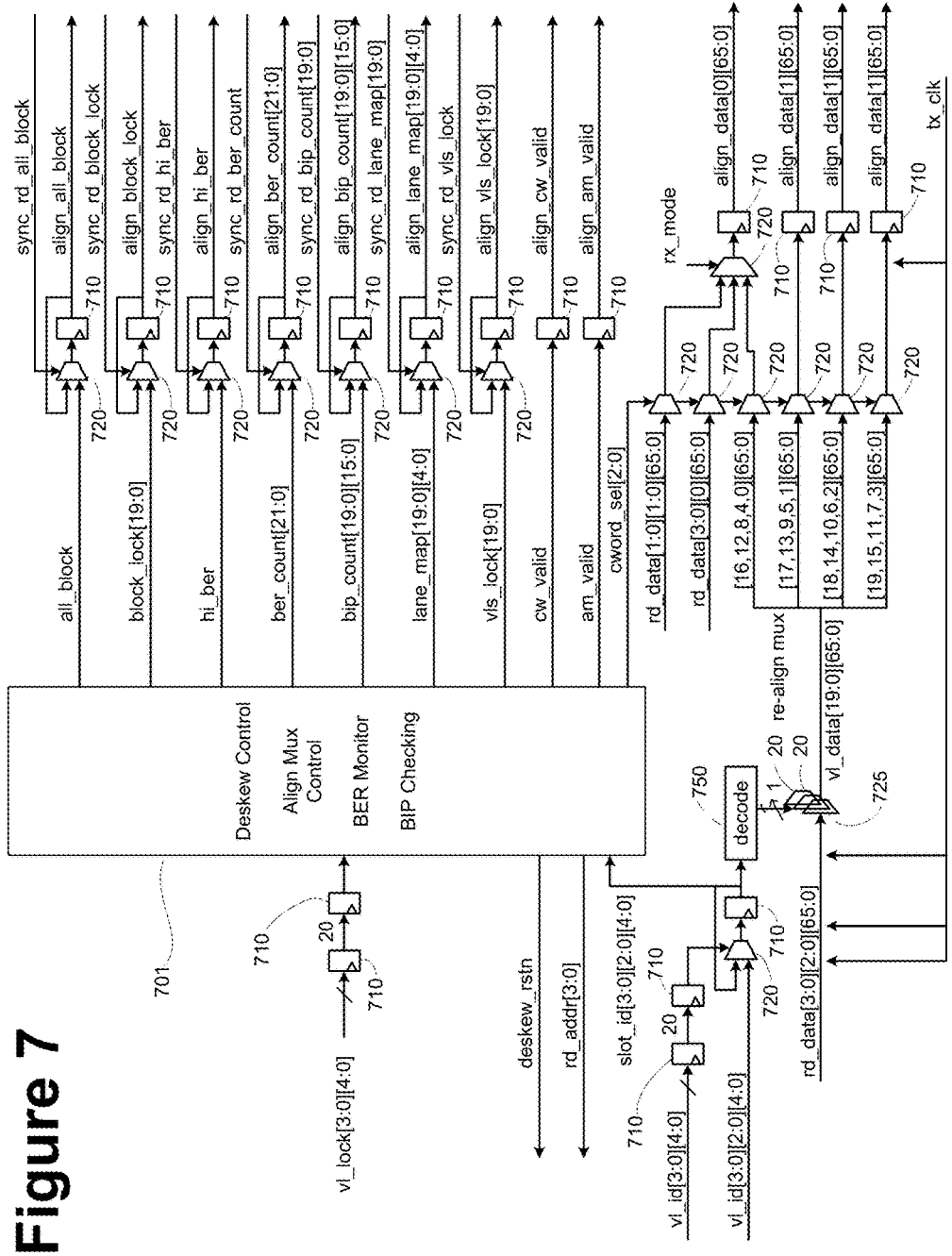
FIG. 7 is a simplified block diagram illustrating an alignment Mux according to an embodiment of the present invention.

For the alignment and de-skew functions to work, they are by one or more control module (e.g., control module 104 shown in FIG. 1). The alignment Mux in block 104 re-orders the Virtual Lines from deskew FIFO's to be forwarded sequentially to the transcoder module 105. For example, after all Virtual Lines are locked, the Alignment Mux re-orders virtual lines from 0 to 19. The virtual lane ID's are used to re-order VL's from arbitrary Tx slots into correct VL order. FIG. 7 is a simplified block diagram illustrating an alignment Mux according to an embodiment of the present invention. This diagram is merely an example, which should not unduly limit the scope of the claims. One of ordinary skill in the art would recognize many variations, alternatives, and modifications. Module 701 provides deskew control, align mux control, BER monitor, and BIP checking. Module 701 receives vl_lock and vl_ld as input. Outputs include deskew_rstn, rd_addr, all_block, block_lock, hi_ber, ber_count, bip_count, lane_map, vls_lock, cw_valid, and am valid as shown. FIG. 7 further illustrates a plurality of flip flops 710, a plurality of multiplexers 720, one or more multiplexers 725, and a block circuit 750.

For 4×10 G configuration, only one virtual line from each channel (physical line) is staged every four clock cycles. All four code words from all channels are available to the transcode module at the same time. For 2×20 G configuration, the first two channels have two virtual lanes available from each channel to be forwarded to the transcode module. The alignment mux stages all four virtual lanes at the same time. All four code words are available at the same time for transcode module, which is the same as 4×10 G.

For 4×25 G configuration, the Alignment Mux forwards four code words at a time from the deskew FIFO's to the Transcode module. The Alignment Mux forwards all 20 Virtual Lanes to the Transcode module after five cycles. The transcode module processes all four code words every cycle.

Figure 8A:
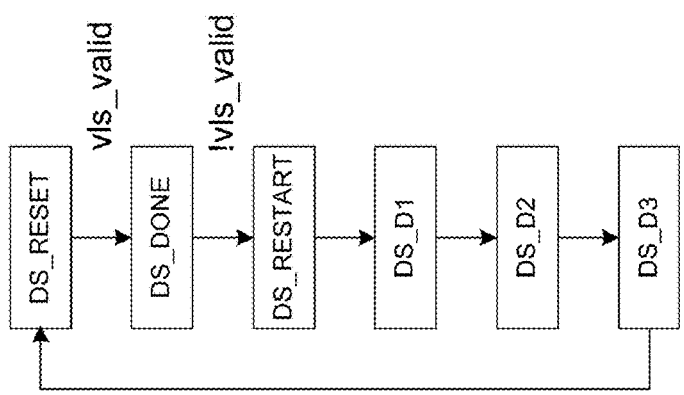
FIG. 8A is a simplified flow diagram illustrating the de-skew state machine.

As a part of the control module 104, the de-skew control provides a de-skew state machine that is triggered once the alignment lock is achieved on all lanes. It remains in the de-skew "done" state until either a loss of alignment lock or re-acquire lock is triggered. FIG. 8A is a simplified flow diagram illustrating the de-skew state machine. This diagram is merely an example, which should not unduly limit the scope of the claims. One of ordinary skill in the art would recognize many variations, alternatives, and modifications. As an example, the de-skew states are provided below in Table 4:

TABLE 4

Deskew FSM Description

| State | Description |
|---|---|
| DS_RESET | This is the default state of the Deskew FSM. State is entered on reset. Transition to DS_DONE occurs once AM lock is achieved, indicated by vls_valid |
| DS_DONE | This is the Deskew done state and once AM lock is set, the FSM remains in this state. Loss of AM lock will transition to DS_RESTART state. The rd_addr to the FIFO is incremented in this state. |
| DS_RESTART, DS_D1, DS_D2, DS_D3 | Deskew restart state. The FIFO write and read pointers are reset. |

Figure 8B:
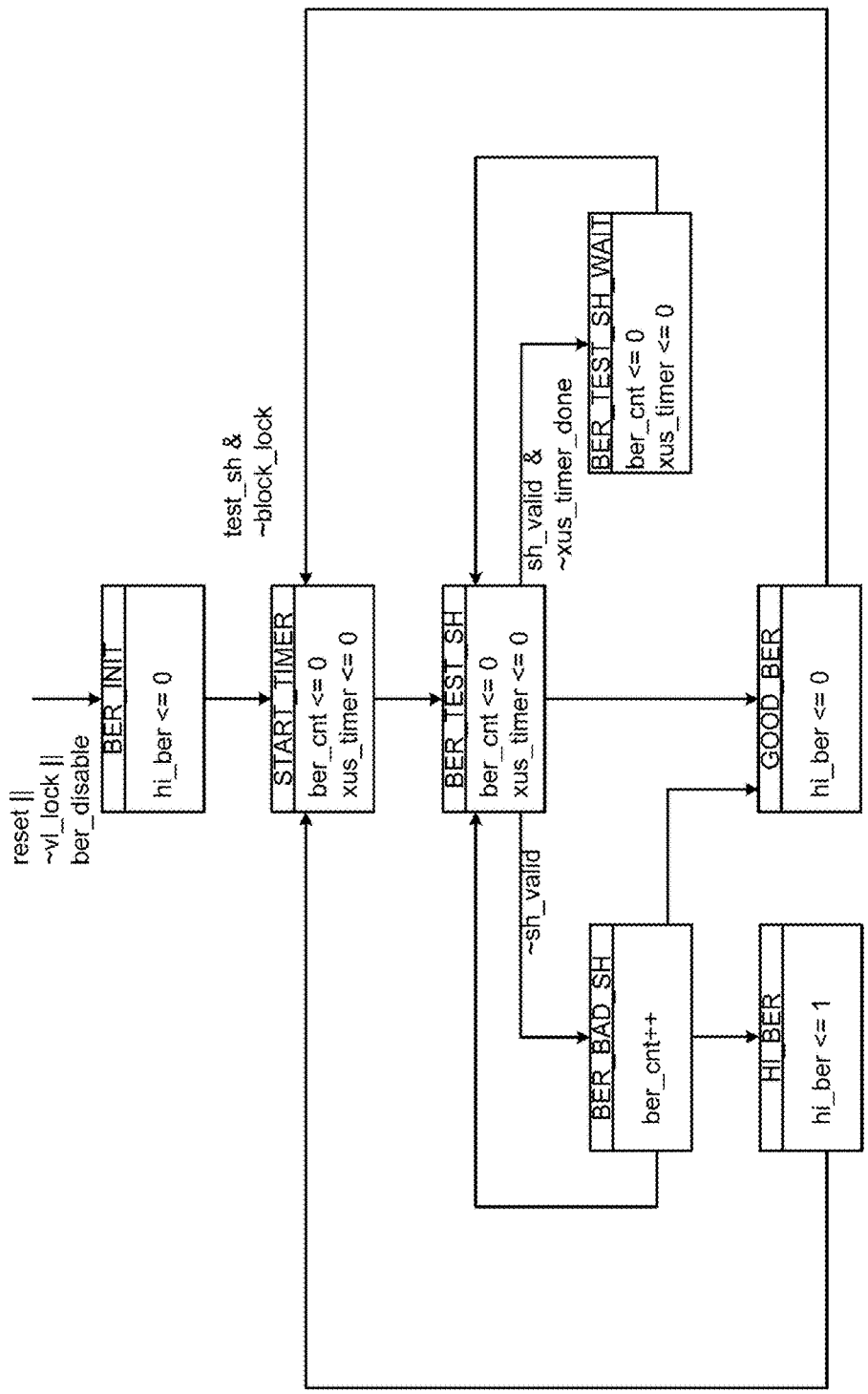
FIG. 8B is a simplified flow diagram illustrating the BER operation.

The control module 104 further comprises a BER monitor, as shown. The BER Monitor monitors the aggregated signal from all virtual lines. In an embodiment, the high BER is flagged when 97 invalid 66*b* sync header are detected within 500 us (xus_timer) for 100 G or 1.25 ms (xus_timer) for 40 G. The high BER flag is cleared when there are less than 97 invalid headers within specified time. FIG. 8B is a simplified flow diagram illustrating the BER operation. This diagram is merely an example, which should not unduly limit the scope of the claims. One of ordinary skill in the art would recognize many variations, alternatives, and modifications.

In various embodiments, protocol lock module has an interface that is described in Table 5 below:

TABLE 5

Protocol Lock Interface Description

| Signal Name | Direction | Width | Reference Clock | Description |
|---|---|---|---|---|
| Datapath interface | | | | |
| rx_clk | Input | 4 | | Receive clock from CAUI-Rx lane 0 to 3. Note that there 4 receive clocks, each clock is used by one instance of the Protocol Lock module |
| rx_data | Input | 4 × 40 | rx_clk[3:0] | Receive data from CAUI-Rx lane 0 to 3 |
| rx_mode | Input | 3 | Register clock | Rx Mode: 000 - 4x10G Mode 001 - 2x20G Mode 010 - 4x25G Mode 100 - OTL3.4 110 - OTL4.4 |
| blk_lock | Output | 20 | rx_clk[3:0] | Block locked status for each lane. There are 4 Protocol Lock instances and each Protocol Lock instance drives 5 ports, each port is 1b. |
| vl_lock | Output | 20 | rx_clk[3:0] | Virtual lane lock status, each Protocol Lock instance drives 5 ports. Same as blk_lock. |
| vl_id | Output | 4 × 5 × 5 | rx_clk[3:0] | Virtual lane ID [4:0]. There are 4 channels and each channel drives five ID, each ID is 5b wide. |
| vl_write | Output | 20 | rx_clk[3:0] | Virtual lane write, used by Deskew FIFO. Five ports for each Protocol Lock instance. |
| cw_write | Output | 20 | rx_clk[3:0] | |
| algn_data | Output | 264 | tx_clk_b | [263:0] used by 4x25G mode [65:0] used by 40G mode |
| algn_block_lock | Output | 20 | rx_clk_625m_x | Block lock status for each lane |
| algn_am_lock | Output | 1 | rx_clk_625m_x | AM lock status |
| algn_am_valid | Output | 1 | rx_clk_625m_x | AM Valid marker, which signifies the output data carries the Alignment marker on the cycle. |
| tcode_req | Input | 1 | tx_clk_625m | Request read operation from Transcode |
| Test Interface | | | | |
| tx_scan_mode | Input | 1 | Test clock | Scan mode |
| tx_scan_in | Input | X | Test clock | Scan in |
| tx_scan_en | Input | 1 | Test clock | Scan enable |
| algn_scan_out | Output | X | Test clock | Scan out |
| Clock/Reset interface | | | | |
| rx_clk_625m_0 | Input | 1 | | Rx clock of lane 0 |
| rx_clk_625m_1 | Input | 1 | | Rx clock of lane 1 |
| rx_clk_625m_2 | Input | 1 | | Rx clock of lane 2 |
| rx_clk_625m_3 | Input | 1 | | Rx clock of lane 3 |
| tx_clk_625m | Input | 1 | | Tx clock, to be used for 40G |
| tx_clk_390m | Input | 1 | | Tx clock, to be used for 100G |
| rx_reset_clk625m_0_n | Input | 1 | rx_clk_625m_0 | Active low reset synchronized to rx_clk_625m_0 |
| rx_reset_clk625m_1_n | Input | 1 | rx_clk_625m_1 | Active low reset synchronized to rx_clk_625m_1 |
| rx_reset_clk625m_2_n | Input | 1 | rx_clk_625m_2 | Active low reset synchronized to rx_clk_625m_2 |
| rx_reset_clk625m_3_n | Input | 1 | rx_clk_625m_3 | Active low reset synchronized to rx_clk_625m_3 |
| tx_reset_clk625m_n | Input | 1 | tx_clk_625m | Active low reset synchronized to tx_clk_625m |
| tx_reset_clk390m_n | Input | 1 | tx_clk_390m | Active low reset synchronized to tx_clk_390m |

Figure 9:
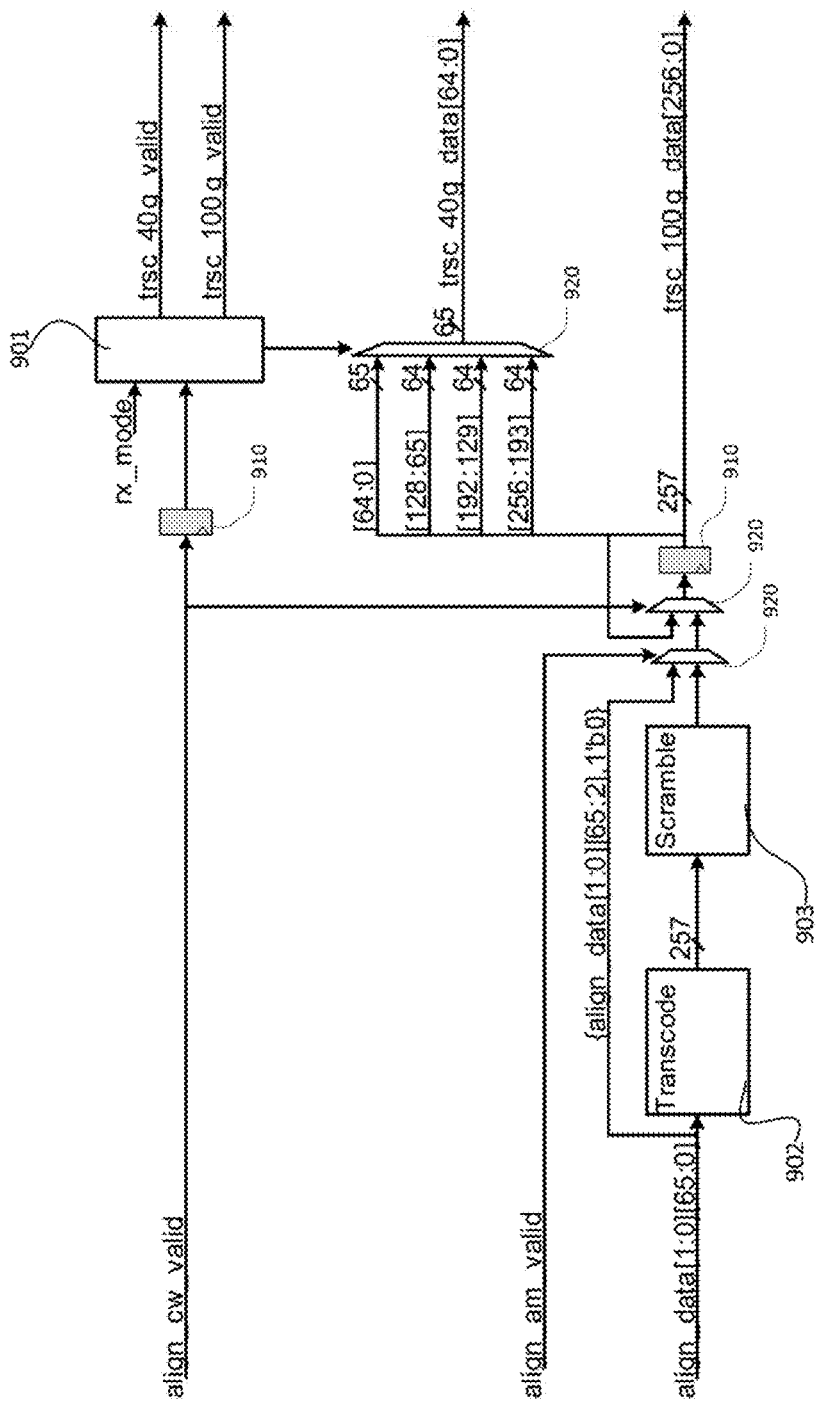
FIG. 9 is a simplified block diagram illustrating a trancoder according to an embodiment of the present invention.

Now referring back to FIG. 1. After alignment is performed, the received data are transcoded, by transcoder module 105. FIG. 9 is a simplified block diagram illustrating a transcoder according to an embodiment of the present invention, including multiplexor/demultiplexor block 902 and flip-flop 904. This diagram is merely an example, which should not unduly limit the scope of the claims. One of ordinary skill in the art would recognize many variations, alternatives, and modifications. The transcoder module 104 in FIG. 1 performs the 64/66 to 256/257b conversion in both 40 G-PAM4 and 100 G-PAM8 applications. The module takes in 264b input every cycle for 100 G and it takes 264b input every four cycles for 40 G mode. The module concatenates four consecutive 66b words to form a single 264b word to be transcoded in the 40 G mode. For example, transcoder in FIG. 9 includes, among other features, a mode selector that receives an rx_mode input. The data align_data is processed by transcode bock 902 and then scramble block 903. FIG. 9 further illustrates a plurality of flip flops 910 and a plurality of multiplexers 920.

In order to describe the transcoding, the 264b word is split into four 66b words, marked as align_data[3:0][65:0]. The rules for transcoding are described as follows.

All data blocks
    tx_xcoded[0]=1;
    tx_xcoded[256:1]={align_data[3][65:2],align_data[2][65:2],align_data[1][65:2],align_data[0][65:2]};

Valid control blocks with and without data blocks
Case 1: CDDD, Control followed by 3 data or CCCC, All control
    tx_xcoded[0]=0;
    tx_xcoded[4:1]={align_data[3][1],align_data[2][1],align_data[1][1],align_data[0][1]};
    tx_xcoded[256:5]={align_data[3][65:2],align_data[2][65:2],align_data[1][65:2],align_data[0][65:10],align_data[0][6:2]};
Case 2: DCDD, Data followed by Control followed by 2 data
    tx_xcoded[0]=0;
    tx_xcoded[4:1]={align_data[3][1],align_data[2][1],align_data[1][1],align_data[0][1]};
    tx_xcoded[256:5]={align_data[3][65:2],align_data[2][65:2],align_data[1][65:10],align_data[1][6:2],align_data[0][65:2]};
Case 3: DDCD, 2 Data followed by Control followed by 1 data
    tx_xcoded[0]=0;
    tx_xcoded[4:1]={align_data[3][1],align_data[2][1],align_data[1][1],align_data[0][1]};
    tx_xcoded[256:5]={align_data[3][65:2],align_data[2][65:10],align_data[2][6:2],align_data[1][65:2],align_data[0][65:2]};
Case 4: DDDC, 3 Data followed by Control
    tx_xcoded[0]=0;
    tx_xcoded[4:1]={align_data[3][1],align_data[2][1],align_data[1][1],align_data[0][1]};
    tx_xcoded[256:5]={align_data[3][65:10],align_data[3][6:2],align_data[2][65:2],align_data[1][65:2],align_data[0][65:2]};

Invalid control blocks
    tx_xcoded[0]=0;
    tx_xcoded[4:1]=4'b1111;
    tx_xcoded[256:5]={align_data[3][65:2],align_data[2][65:2],align_data[1][65:2],align_data[0][65:10],align_data[0][6:2]};

Alignment Marker
    tx_xcoded[0]=0;
    tx_xcoded[256:1]={align_data[3][65:2],align_data[2][65:2],align_data[1][65:2],align_data[0][65:2]};

The 257b tx_xcoded data is then scrambled according to the following equation. The alignment marker code word bypasses the scrambling stage.

$$tx\_scrambled[256:0] = \{tx\_xcoded[256:5], tx\_xcoded[12:8]\,\hat{}\,tx\_xcoded[4:0]\};$$

In the 40 G mode, the 257b data is fed to the BCH Encoder module in 4 clocks as 65b data and 1b valid and will follow these rules.

Cycle 1: Valid is true and data is 65b
Cycle 2 to 4: Valid is false and data is 64b As an example, the data rate after transcoding is given by the following equation.

$$10.3125 \text{ Gbps} \times 4 = 41.25 \text{ Gbps} \times \frac{64}{66} \times \frac{257}{256} = 40.15625 \text{ Gbps}$$

The transcoder block will run at 625 Mhz in 40 G mode.

In the 100 G mode, the entire 257b data is fed to the BCH Encoder module and so the data rate after transcoding is given by the following equation:

$$103.125 \text{ Gbps} \times \frac{64}{66} \times \frac{257}{256} = 100.390625 \text{ Gbps}$$

For example, the transcoder block runs at 390.625 Mhz in 100 G mode.

The transcoder module interface is provided in Table 6 below:

TABLE 6

| | | | | |
|---|---|---|---|---|
| Transcoder Interface Description | | | | |
| Signal Name | Direction | Width | Reference Clock | Description |
| Datapath interface | | | | |
| algn_txd_40g | Input | 66 | tx_clk_625m | 66b Aligned data used in 4x10G or 2x20G mode |
| algn_txd_100g | Input | 264 | tx_clk_390m | 264b Aligned data used in 4x25G mode |
| tx_mode | Input | 2 | Register clock | Rx Mode:<br>00 - 4x10G Mode<br>01 - 2x20G Mode<br>10 - 4x25G Mode |
| algn_am_valid | Input | 1 | rx_clk_625m_x | AM Valid marker, which signifies the output data carries the Alignment marker on the cycle. |
| map_wd_req | Input | 1 | tx_clk_625m | Request read operation |
| trsc_txd_100g | Output | 257 | tx_clk_390m | 257b Transcoded data for 100G mode |

TABLE 6-continued

Transcoder Interface Description

| Signal Name | Direction | Width | Reference Clock | Description |
|---|---|---|---|---|
| trsc_txd_vld | Output | 1 | tx_clk_625m | Valid when true indicates 65b data else 64b data in 40G mode |
| trsc_txd_40g | Output | 65 | tx_clk_625m | 65b Transcoded data for 40G mode |
| Test Interface | | | | |
| tx_scan_mode | Input | 1 | Test clock | Scan mode |
| tx_scan_in | Input | X | Test clock | Scan in |
| tx_scan_en | Input | 1 | Test clock | Scan enable |
| trsc_scan_out | Output | X | Test clock | Scan out |
| Clock/Reset interface | | | | |
| tx_clk_625m | Input | 1 | | Tx clock, to be used for 40G |
| tx_clk_390m | Input | 1 | | Tx clock, to be used for 100G |
| tx_reset_clk625m_n | Input | 1 | tx_clk_625m | Active low reset synchronized to tx_clk_625m |
| tx_reset_clk390m_n | Input | 1 | tx_clk_390m | Active low reset synchronized to tx_clk_390m |

In various embodiments, a PAM-4 BCH encoder is used. The design uses a (n=1440,k=1285,t=14) BCH Encoder and a $GF(2^{11})$ field. This code uses 1 dummy bit to make up for 1440 bits after 154b of parity is added to the incoming message. The selected code is a 9% overhead code, as given by the following equation.

$$4 \times 10.3125G = 41.25G \times \frac{64}{66} \times \frac{257}{256} \times \frac{1440}{1285}$$

Implementation of PAM-4 module interface is provided in the table 7 below.

TABLE 7

PAM-4 Encoder Interface Description

| Signal Name | Direction | Width | Reference Clock | Description |
|---|---|---|---|---|
| Datapath interface | | | | |
| trsc_txd_vld | Input | 1 | tx_clk_625m | Valid when true indicates 65b data else 64b data in 40G mode |
| trsc_txd_40g | Input | 65 | tx_clk_625m | 65b Transcoded data for 40G mode |
| p4enc_dummy | Input | 8 | Register clock | 8b Dummy bits |
| p4enc_txd_40g | Output | 66 | tx_clk_625m | 66b BCH Encoded data |
| Test Interface | | | | |
| tx_scan_mode | Input | 1 | Test clock | Scan mode |
| tx_scan_in | Input | X | Test clock | Scan in |
| tx_scan_en | Input | 1 | Test clock | Scan enable |
| p4enc_scan_out | Output | X | Test clock | Scan out |
| Clock/Reset interface | | | | |
| tx_clk_625m | Input | 1 | | Tx clock, to be used for 40G |
| tx_reset_clk625m_n | Input | 1 | tx_clk_625m | Active low reset synchronized to tx_clk_625m |

Figure 10:
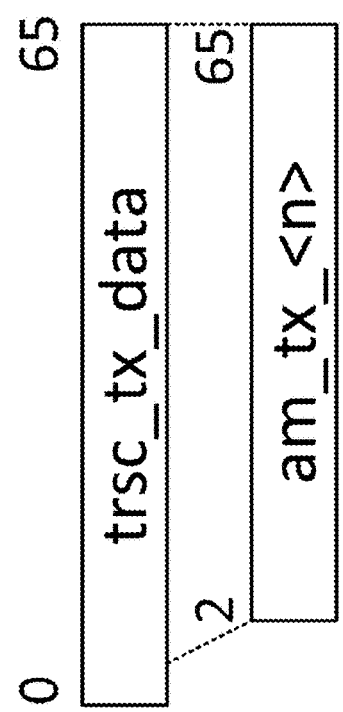

The transcoder 105 additionally provides alignment marker mapping. For example, the transcoder outputs the 257b as 1 cycle of 128b followed by 1 cycle of 129b and this repeats. In the 100 G PAM4 mode, the Alignment Marker mapping function operates on twenty 66b aligned and reordered alignment markers. Of the 66b, the 2b synchronization header is stripped and the remaining 64b are mapped as shown in FIG. 10. Five padding bits are added such that 1 padding bit is added after every four AM markers. This equates to 64*20+5=1285, which is five blocks of 257b.

Because of the dual-lambda transmitter and subsequently receiving 2 lanes of 50G PAM4, the transmit data needs to ensure that a 64b AM marker is not split between the two lanes. This helps achieve synchronization and de-skew of the data across the two lanes. Also, this implies that the data leaving the gearbox is two sets of data, each N bits wide. For example, N is determined based on the implementation. In various implementations, the alignment marker mapping of the twenty aligned and reordered alignment markers follow the mapping as shown in FIG. 11.

For example, the mapping function adheres to one or more of the following rules:

am_tx_0 always appears on lane 0

All even numbered indices of am_tx_<n> appear on lane 0

All odd numbered indices of am_tx_<n> appear on lane 1

Padding bits, P[4:0], is always the $129^{th}$ bit fec_prty_0 contains [0:76] and fec_prty_1 contains [77:153] of the computed fec parity[0:153]

Dummy bit, D0, always appears on lane 0

The sum total of all the above bits is 1440(1285 AM+154 Parity+1 dummy), which is the FEC block size.

Figure 12:
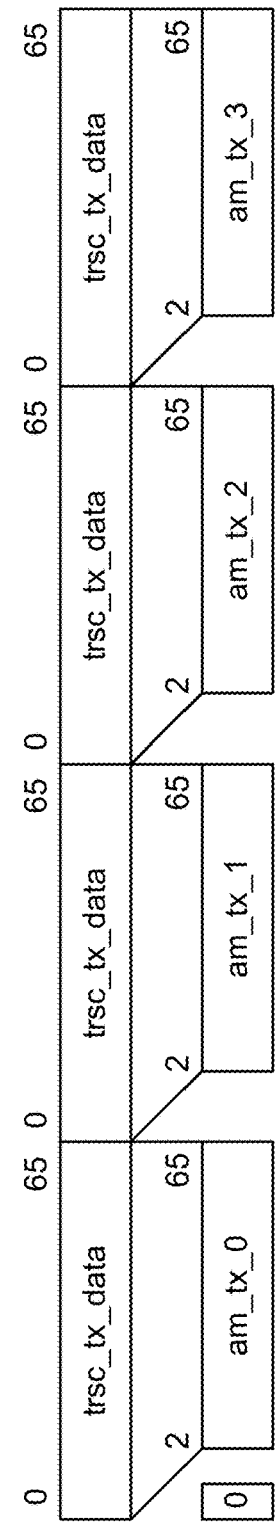

In the 40 G PAM4 mode, the alignment markers includes four 66b aligned markers and is treated as all control blocks by the transcoder. The transcoder compresses the four 66b alignment marker into one 257b block as shown in FIG. 12. This is a slight variation to the IEEE 802.3bj/D2.0 specification. The variation is to keep the 64b Alignment marker intact. In contrast, certain markers according to the IEEE 802.3bj/D2.0 are discarded.

In the 40 G PAM4 mode, the alignment marker mapping is relatively straight forward and all four alignment markers appear on lane 0 as shown in FIG. 13. The padding bit, P0, appears on the $129^{th}$ bit.

According to various implementations, the alignment markers appear once every 16384×20×66 bit blocks in 100 G Mode and 16384×4×66 bit blocks in 40 G Mode. Four of the 66b block goes through a 257/256 Transcode. In the 100 G Mode, the resulting bits are 16384×20×64×257/256, which is equivalent to 16384×5×257, as shown in FIG. 14. This equates to 16384 BCH code words with each code word of 1285 bits.

Figure 15:
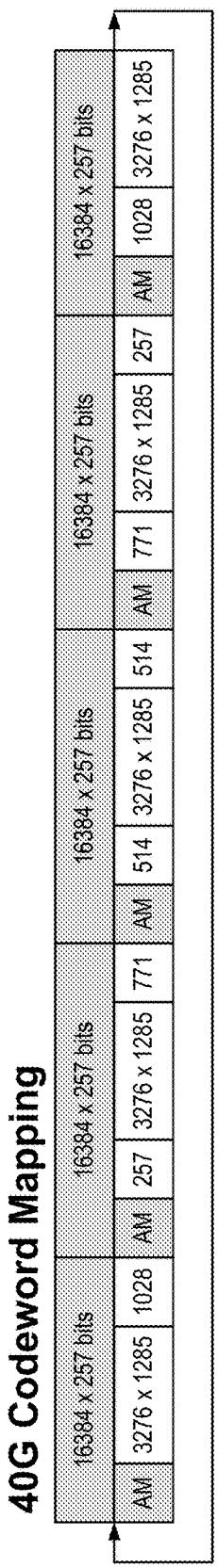

In case of 40 G Mode, the resulting bits are 16384×4×64×257/256, which is equivalent to 16384×257. This equates to 3276.8 BCH code words with each code word of 1285 bits, which leaves with residual bits to be transmitted after the next alignment marker. There will be four cycles with residual bits and every $5^{th}$ cycle, the code words will line up with no residual bits. The no of residual bits are 257,514,771 and 1028 respectively for the $1^{st}$ to $4^{th}$ cycle. This is needed to determine where the boundary of the BCH code words resides on the receiving side. FIG. 15 shows the residual bits of the code word along with Alignment Markers.

Now referring back to FIG. 1. The data from the encoder 107 is provided to the gearbox 108 and 109. The gearbox is required to translate the 1440 b code words streaming out of the FEC Encoder into two streams of 80b for the 100 G Mode and one stream of 64b for the 40 G mode. As an example, the baud rates for the two modes is given by the following equations:

$$4 \times 10.3125G = 41.25G \times \frac{64}{66} \times \frac{257}{256} \times \frac{1440}{1285} = \frac{45G}{2(PAM4)} = 22.5G$$

$$4 \times 25.78125G =$$
$$103.125G \times \frac{64}{66} \times \frac{257}{256} \times \frac{1440}{1285} = \frac{112.5G}{2(Dual\ \lambda)} = \frac{56.25G}{2(PAM4)} = 28.125G$$

For example, in the 100 G mode, the 1440 b is split across two lanes, each having 720b and in the 40 G mode, the entire 1440 b is transmitted on a single lane. The stream of data out of the FEC Encoder follows the sequence of 128/129/128/129/128/78 or 129/128/129/128/129/77 split into two lanes for the 100 G mode and 128/129/128/129/128/129/128/129/128/129/78/77 on a single lane for the 40 G mode. To keep the alignment markers intact on a lane, it would make sense to have two gearboxes, one for each lane in the 100 G mode, and enable one in the 40 G mode, while disabling the second.

Figure 16:
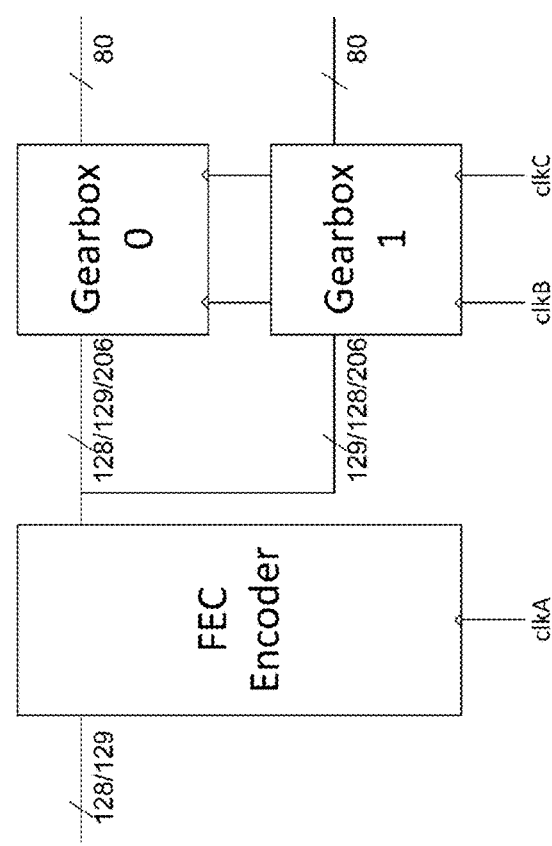
FIG. 16 is a simplified block diagram illustrating an FEC encoder with the gearboxes according to embodiments of the present invention.

FIG. 16 is a simplified block diagram illustrating an FEC encoder with the gearboxes according to embodiments of the present invention. This diagram is merely an example, which should not unduly limit the scope of the claims. One of ordinary skill in the art would recognize many variations, alternatives, and modifications.

The Transcoder will outputs alternating cycles of 128b and 129b with am_tx_0/1 lining up to be 128b as the start of Alignment Marker. The FEC Encoder will output alternating cycles of 128b and 129b for 4 cycles and on the $5^{th}$ cycle, the FEC Encoder outputs 206b, which would be 128b+78b for Gearbox 0 and 129b+77b for Gearbox 1.

For each Gearbox, FEC encoded data is written in 720b over 5 cycles, while the read at 80b would take 9 cycles in the 100 G mode. In the 40 G mode using Gearbox 0 only, data is written in 1440 b over 10 cycles, while the read at 80b would take 18 cycles. So looking at both modes of operation, the ratio of write to read is 5:9. The write operation, on average, is 144b(720/5 or 1440/10) on each cycle.

Figure 17:
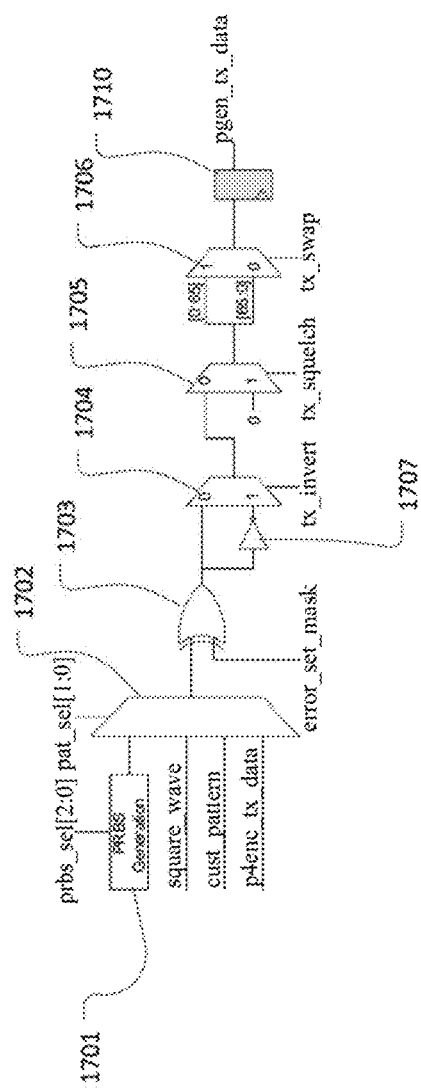
FIG. 17 is a simplified diagram illustrating a pattern generator according to an embodiment of the present invention.

The gearbox 108 is coupled to the pattern generator 110. FIG. 17 is a simplified diagram illustrating a pattern generator according to an embodiment of the present invention, including flip-flop 1702. This diagram is merely an example, which should not unduly limit the scope of the claims. One of ordinary skill in the art would recognize many variations, alternatives, and modifications. Selector 1702 receives input from PRBS generator 1701, square_wave, and cust_pattern, and p4enc_tx_data. Output of selector 1702 is connected to error set mask logic 1703. Selector 1704 selects between the output of selector 1702 and inverted output of selector 1702 from the invertor 1707. Output of the selector 1704 is connected to the selector 1705, which provides quelch function. Output of selector 1705 is connected to selector 1706, which provides swap function. FIG. 17 further illustrates a flip flop. Among other things, a pattern generator module performs the following functions:

PRBS Generation of PRBS7, PRBS9, PRBS11, PRBS15, PRBS23 and PRBS31

Square Wave Pattern Generation of 16'hFF00

Custom Pattern Generation based on 33×64 configured memory

IEEE Test patterns like JP03A, JP03B and Quad PRBS13

Error Injection using an error mask register (e.g., selector 1703 )

Transmit Polarity inversion (e.g., selector 1704)

Transmit disable feature (e.g., selector 1705)

Bit swap feature (e.g., selector 1706)

Among other things, the PRBS generation mode of the pattern generator 110 supports the transmission of the following PRBS patterns and its inverse.

PRBS7: $1+x^6+x^7$
PRBS9: $1+x^5+x^9$
PRBS11: $1+X^9+X^{11}$
PRBS15: $1+x^{14}+x^{15}$
PRBS23: $1+x^{18}+x^{23}$
PRBS31: $1+x^{28}\pm x^{31}$

In various embodiments, the PRBS enable, selection and the inverse functions are user configurable. The output width is designed to be a parameterized one depending on the mode of the chip is running.

Custom Pattern Generation function of the pattern generator supports the transmission of a Custom Pattern as configured in 33×64b Memory. For example, the pattern is written via MDIO as 132 locations of 16 b. The MDIO Write is done as read-modify-write operation into the memory. On enabling the custom pattern enable bit, the programmed pattern is read out starting with location 0 and incrementing up to 32 and then restarting at 0. This pattern is repeated on every 2112b of data until the enable bit is cleared. In various implementations, the custom pattern enable and the pattern memory are user configurable via MDIO. The memory can also be read out via MDIO.

Square Wave Generation functions is provided to support the transmission of a square wave pattern defined to be 16'hFF00. The pattern is programmed into the low 16 b location of address 0 of custom pattern memory. This pattern is read out and repeated until the square_wave enable bit is cleared. The square_wave enable is user configurable.

IEEE Test Pattern Generation is provided to support the transmission of JP03A, JP03B and Quad PRBS13 as defined in IEEE 802.3bj Draft 2.1. For example, the JP03A Test pattern consists of sending {0,3} symbols in 40 G-PAM4 mode and 100 G-PAM4 mode. This translates to 4b, which is written via MDIO into location 0 of custom pattern memory. This pattern is read out and repeated until the JP03A enable bit is cleared. The JP03A enable is user configurable.

The JP03B Test pattern consists of sending 15 {0,3} symbols followed by 16 {3,0} in 40 G-PAM4 mode and 100 G-PAM4 mode. This translates to 124b, which is written via MDIO into location 0, 1 and 2 of custom pattern memory. This pattern is read out and repeated until the JP03B enable bit is cleared. The JP03B enable is user configurable.

The Quad PRBS13 Test pattern, which applies in 40 G-PAM4 and 100 G-PAM4 mode, consists of sending 3 full cycles of 8191 bits followed by 1 cycle of 6523 bits. This translates to 31096 bits repeated. The bits in the first and third cycle are non-inverted while bits in the second and fourth cycle are inverted. The PRBS13 is initialized at the end of every cycle. The design includes a 92b wide PRBS to support this feature, following the above rules. This 92b is then translated to 66b output to be sent out. The Quad PRBS13 enable is user configurable.

Error Injection function supports an Error Injection capability into the transmit stream using an Error Set Mask register. The Error Set Mask register is user configurable and will be defined to be the width of the widest transmit stream. If the Error Set Mask register is cleared, then no Errors are injected. If the bits of the Error Set Mask register are set to 1, then the corresponding transmit bits are inverted.

Transmit Polarity, Swap and Disable functions are provided to support polarity inversion of each transmit bit, swap of each transmit bit and transmit disable. Each one of the feature is user configurable independently. In terms of sequence of the configuration, polarity gets applied first followed by disable and finally swap. This order is fixed in design and cannot be altered.

As an example, an exemplary pattern generator interface is shown in the Table 8 below:

TABLE 8

Pattern Generator Interface Description

| Signal Name | Direction | Width | Reference Clock | Description |
|---|---|---|---|---|
| Datapath interface | | | | |
| mreg_prbs_en | Input | 1 | Register clock | Tx PRBS Enable |
| mreg_prbs_mode | Input | 3 | Register clock | 3b PRBS Select, 0 - PRBS31, 1 - PRBS9, 2 - PRBS7, 3 - PRBS11, 4 - PRBS15, 5 - PRBS23 |
| mreg_prbs_inv | Input | 1 | Register clock | PRBS Invert enable |
| mreg_prbs_ld_init | Input | 1 | Register clock | Load PRBS with a init value of 1 |
| mreg_sq_wave_en | Input | 1 | Register clock | Tx Square Wave Enable |
| mreg_cust_pat_en | Input | 1 | Register clock | Tx Custom Pattern Enable |
| mreg_cust_pat_clr_mem | Input | 1 | Register clock | Clear Custom pattern memory |
| mreg_cust_pat_wr | Input | 1 | Register clock | Write strobe for Custom Pattern memory |
| mreg_cust_pat_rd | Input | 1 | Register clock | Read strobe for Custom Pattern memory |
| mreg_cust_pat_wraddr | Input | 8 | Register clock | Write address for Custom pattern memory |
| mreg_cust_pat_rdaddr | Input | 8 | Register clock | Read address for Custom pattern memory |
| mreg_cust_pat_wrdata | Input | 16 | Register clock | Write data for Custom pattern memory |
| mreg_tx_err_mask_en | Input | 1 | Register clock | Error Mask enable |
| mreg_tx_err_mask | Input | 66 | Register clock | 66b Error Set Mask |
| mreg_tx_invert_en | Input | 1 | Register clock | Tx Polarity Inversion Enable |
| mreg_tx_squelch_en | Input | 1 | Register clock | Tx Disable configuration |
| mreg_tx_swap_en | Input | 1 | Register clock | Tx bit Swap enable |
| mreg_jp03a_en | Input | 1 | Register clock | JP03A Enable |
| mreg_jp03b_en | Input | 1 | Register clock | JP03B Enable |
| mreg_qprbs13_en | Input | 1 | Register clock | Quad PRBS13 Enable |
| mreg_tx_mode | Input | 3 | Register clock | Tx mode |
| p4enc_txd_40g | Input | 66 | tx_clk_625m | 66b Tx data |
| p4enc_txd_100g | Input | 264 | tx_clk_625m | 264b Tx data |
| pgen_txd_out | Output | 264 | tx_clk_625m | 66b or 264b Tx Data output |
| pgen_cust_pat_rddata | Output | 16 | tx_clk_625m | 16b MDIO read data |
| pgen_cust_pat_gap_en | Output | 1 | tx_clk_625m | Custom pattern gap clock enable |
| Test Interface | | | | |
| tx_scan_mode | Input | 1 | Test clock | Scan mode |
| tx_scan_in | Input | X | Test clock | Scan in |
| tx_scan_en | Input | 1 | Test clock | Scan enable |
| pgen_scan_out | Output | X | Test clock | Scan out |

TABLE 8-continued

Pattern Generator Interface Description

| Signal Name | Direction | Width | Reference Clock | Description |
|---|---|---|---|---|
| Clock/Reset interface | | | | |
| pgen_tx_clk | Input | 1 | | Tx clock, to be used for 40G |
| pgen_tx_gap_clk | Input | 1 | | Tx clock, to be used for 40G |
| mreg_clk | Input | 1 | | Register clock |
| pgen_tx_reset_n | Input | 1 | pgen_tx_clk | Active low reset synchronized to pgen_tx_clk |
| mreg_reset_n | Input | 1 | mreg_clk | Active low reset synchronized to mreg_clk |

Now referring back to FIG. 1. The outputs of the gearboxes are coupled to a first MUX 111 and a second MUX 112. The MUXes, among other things, allow the system to select between output of the gearboxes (i.e., actual transcoded data) and pattern generator (e.g., test data). The PAM Gray maps 113 and 114 are configured to encode the transcoded data for transmission.

In various embodiments, MDIO/I2C Interface is provided. The configuration and status registers in the design are all accessible via 2-pin MDIO or 2-pin I2C interface. Since this IP will reside in a Transmit chip, the design will also provide read/write access to all the configuration and status registers in the chip. The I2CSEL pin, when true, indicates the access is via I2C interface and when false, indicates the access is via MDIO interface. The MDIO and I2C interface are both designed to be slave interface.

In order to figure out the MMD device addresses and from IEEE 802.3ba-2010, Annex 83C, 83C.1.2, the design will assign MMD=30 for the IP, and MMD=31 for registers external to IP. The MMD device addresses are
  MMD=1 will be assigned for the Receive chip
  MMD=30 and 31 for the Transmit chip
  The PHY address can be the same for both the Rx and Tx chips.

Figure 18:
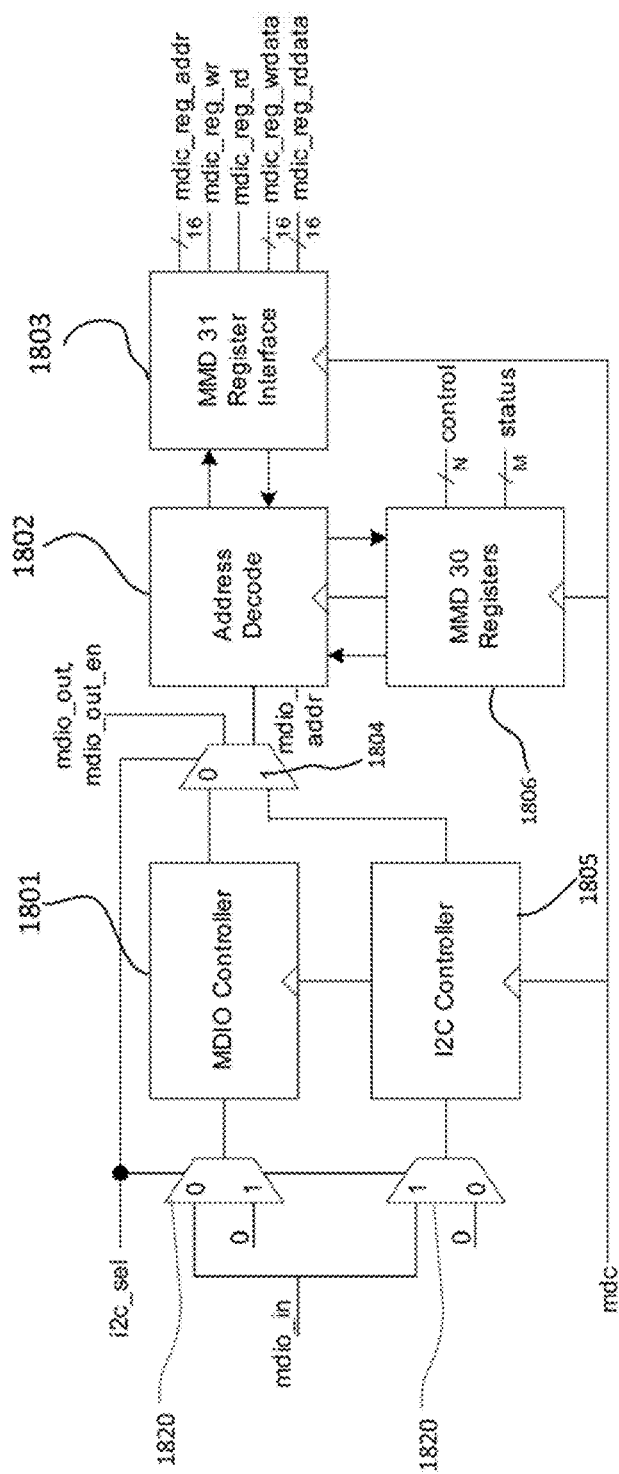
FIG. 18 is a simplified diagram illustrating a MIDO device.

The design incorporates a MDIO Slave protocol state machine, I2C Slave protocol state machine, MMD device 30 registers and MMD device 31 register interfaces. The block diagram of the MDIO interface block is shown in FIG. 18. This diagram is merely an example, which should not unduly limit the scope of the claims. One of ordinary skill in the art would recognize many variations, alternatives, and modifications. As shown, MDIO controller 1801 is connected to the IC2 controller 1805. Output of MDIO controller 1801 is connected to selector 1804. Selector 1804 output is provided to address decode block 1802, which is connected to MMD 30 registers 1806 and MMD 31 register interface 1803. FIG. 18 further illustrates a plurality of multiplexers 1820.

Figure 19:
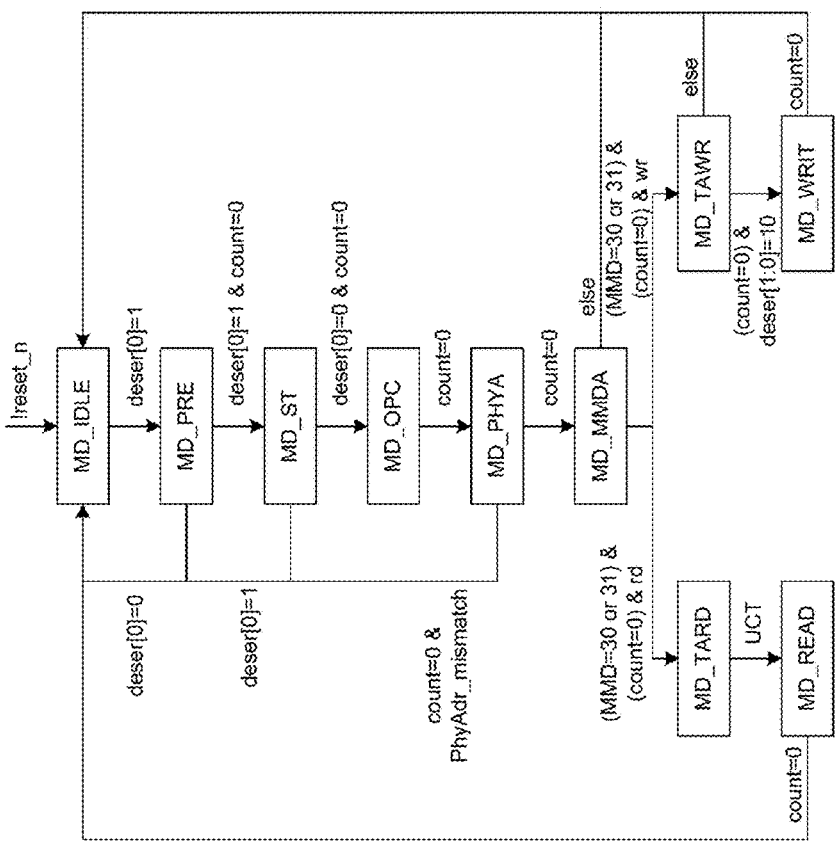
FIG. 19 is a simplified diagram illustrating operation of a MIDO controller according to embodiments of the present invention.

In an embodiment, the MDIO Controller in FIG. 18 adheres to Clause 45 of IEEE 802.3 specification and is implemented as a Slave interface running at the MDC frequency. As an example, FIG. 19 is a simplified diagram illustrating operation of a MIDO controller according to embodiments of the present invention. This diagram is merely an example, which should not unduly limit the scope of the claims. One of ordinary skill in the art would recognize many variations, alternatives, and modifications. Table 19 provides a description for the process:

TABLE 9

MDIO Controller FSM Description

| State | Description |
|---|---|
| MD_IDLE | This is the default state of the MDIO Controller FSM. State is entered on reset. |
| MD_PRE | Ensure 32 MDC clocks of Preamble are seen before every transaction. Transition to MD_ST once at least 32 MDC clocks of Preamble is seen, else MD_IDLE. |
| MD_ST | Start of MDIO transaction state. Expect to see 2 MDC clocks of consecutive 0's and then transition to MD_OPC, else MD_IDLE |
| MD_OPC | Opcode transaction state. This is a wait of 2 MDC clocks. |
| MD_PHYA | Phy Address state. Wait for 5 MDC clocks and then transition to MD_MMDA if the PhyAddr matches the configured value, else transition to MD_IDLE. |
| MD_MMDA | Device Address state. Wait for 5 MDC clocks. On a read transaction and MMD being either 30 or 31, transition to MD_TARD state. On a write transaction and MMD being either 30 or 31, transition to MD_TAWR state, else transition to MD_IDLE. |
| MD_TARD | Read Turn-around state. 2 cycle state. $1^{st}$ cycle output enable is disabled and $2^{nd}$ cycle, output enable is enabled and a 0 is driven |
| MD_READ | Read data state. 16 cycle state. Shift out the 16b read data serially. |
| MD_TAWR | Write Turn-around state. 2 cycle state. Expect to see 'b10 and then transition to MD_WRIT state, else MD_IDLE |
| MD_WRIT | Write data state. 16 cycle state. Assert write strobe on the $15^{th}$ cycle for a write opcode. Capture address on the $16^{th}$ cycle for MMD = 30 or 31 and Address cycle. |

In various embodiments, I2C controllers are used. The I2C implementation maps Clause 45 MDIO transactions onto I2C 16 bit Read and Write operations.

I2C supports Read or Write transactions of an arbitrary number of bytes, and a 7 bit device address.

Clause 45 MDIO is an indirect access method that uses 4 transaction types: Address Write, Data Write, Data Read, and Data Read Auto-increment. All operate on 16 bits of data (2 bytes)

Clause 45 MDIO has hierarchical addressing with both PHY and MMD address fields

In order to map Clause 45 MDIO functionality onto the I2C bus, I2C device address bits are used to provide transaction type and MMD select information. Note that I2C addresses are customarily shown as right justified 8 bit hex number—despite being 7 bits in length. They are labeled A7 through A1, with A7 being the MSB.

The LS I2C address bit "A1" is used in conjunction with I²C R/~W bit to indicate transaction type, as shown in Table 10:

TABLE 10

I2C Transaction Mapping

| R/~W | A1 | MDIO Transaction Type |
| --- | --- | --- |
| 0 | 0 | Address Write |
| 0 | 1 | Data Write |
| 1 | 0 | Data Read - post read address increment |
| 1 | 1 | Data Read |

The address bit "A2" is used to select between the two MMDs implemented in the Tx IP:

A2=0 selects MMD30; A2=1 selects MMD31

The MS 5 address bits "A7-A3" are used to select the device. A7:A3 must match PHYADR4/3/2/1/0. Eight device mappings are available for the Tx IP, selected by the PHYADR pins. Each map uses 4 device addresses to differentiate between transaction types and MMDs. The following table shows device addresses used by each mapping, as shown in Table 11:

TABLE 11

I2C Address Mapping

| | MMD30 | | MMD31 | |
| --- | --- | --- | --- | --- |
| PHYADR2:0 | Address Write or Data Read++ | Data Write or Data Read | Address Write or Data Read++ | Data Write or Data Read |
| 000 | 0x00 | 0x02 | 0x04 | 0x06 |
| 001 | 0x08 | 0x0A | 0x0C | 0x0E |
| 010 | 0x10 | 0x12 | 0x14 | 0x16 |
| 011 | 0x18 | 0x1A | 0x1C | 0x1E |
| 100 | 0x20 | 0x22 | 0x24 | 0x26 |
| 101 | 0x28 | 0x2A | 0x2C | 0x2E |
| 110 | 0x30 | 0x32 | 0x34 | 0x36 |
| 111 | 0x38 | 0x3A | 0x3C | 0x3E |

As an example, the Tx IP is designed to operate with 16 bit (two byte) I²C operations.

Single byte write operations have no effect.

Single Byte Reads will return the MS byte of the addressed register, but will never cause an address auto-increment.

Writes of three or more bytes will complete after the second byte, subsequent bytes will be ignored.

Reads of three or more bytes will complete after the second byte, subsequent bytes will return 0xFF.

Note that data carried by Tx IP I2C bus transactions is in "Big Endian" (MSB first) format, as in Clause 45 MDIO.

Figure 20:
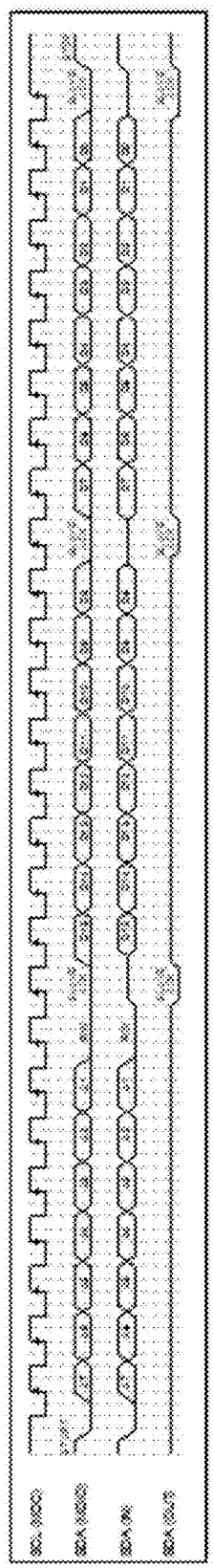
FIGS. 20 and 21 are simplified diagram illustrating I2C write and read sequences according to embodiments of the present invention.
Figure 21:
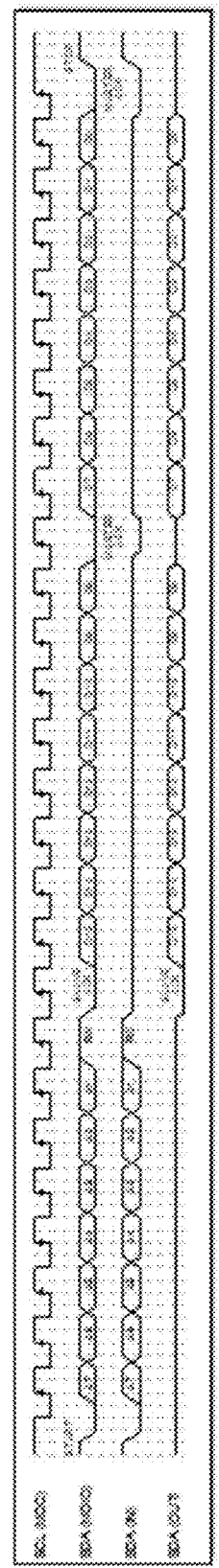

FIGS. 20 and 21 are simplified diagram illustrating I2C write and read sequences according to embodiments of the present invention. The diagram merely provide an example, which should not unduly limit the scope of the claims. One of ordinary skill in the art would recognize many variations, alternatives, and modifications.

As an example, I2C timing my operate in one or more modes. In various embodiments, The Tx IP devices support Standard-mode, Fast-mode and Fast-mode Plus I2C timings. The timing of the I2C interface is defined in the I2C-bus specification and user manual (NXP Semiconductors UM10204).

Note that the I2C State Machine does not use SCL (MDC) as its clock (unlike the MDIO SM which is clocked by MDC). The I2C SM uses the nominally 10 MHz clock (clk_10m) from the clock prescaler as its clock. SCL and SDA are asynchronously sampled using this clock to implement the I2C protocol, and provide glitch suppression.

In various embodiments, MMD 30 Registers are provided. According to various implementations, the MMD 30 Registers are allocated for the configuration and status information of the registers internal to the Tx IP design. An overview of the registers for this particular MMD is specified in the table 12 below:

TABLE 12

MMD 30 Register Overview

| Register address | | Register name | Note |
| --- | --- | --- | --- |
| Decimal | Hex | | |
| 30.0 | 30.0000 | Device Control 1 | |
| 30.1 | 30.0001 | Device Status 1 | Read as zeroes, writes have no effect |
| 30.2, 30.3 | 30.0002-30.0003 | Device identifier | Tx IP identifier |
| 30.4 | 30.0004 | Reserved | Read as zeroes, writes have no effect |
| 30.5, 30.6 | 30.0005-30.0006 | Devices in Package registers | Vendor specific device 1 present bits |

TABLE 12-continued

MMD 30 Register Overview

| Register address | | Register name | Note |
|---|---|---|---|
| Decimal | Hex | | |
| 30.7 | 30.0007 | Reserved | Read as zeroes, writes have no effect |
| 30.8 | 30.0008 | Status register | |
| 30.9-30.13 | 30.0009-30.000D | Reserved | Read as zeroes, writes have no effect |
| 30.14, 30.15 | 30.000E-30.000F | Package identifier | Read as zeroes, writes have no effect |
| 30.16-30.31 | 30.0010-30.001F | Chip Control and Status | 16 16b registers |
| 30.32-30.223 | 30.0020-30.00DF | Pattern Generator block | 192 16b registers |
| 30.224-30.255 | 30.00E0-30.00FF | Protocol Lock and FIFO blocks | 32 16b registers |
| 30.256-30.287 | 30.0100-30.011F | Transcoder block | 32 16b registers |
| 30.288-30.351 | 30.0120-30.015F | BCH Encoder blocks | 64 16b registers |
| 30.352-30.359 | 30.0160-30.0167 | Mapper blocks | 8 16b registers |
| 30.360-30.375 | 30.0168-30.0177 | Channel Training Registers | 16 16b registers |
| 30.376-30.391 | 30.0178-30.0187 | Misc Registers | 16 16b registers |
| 30.392-30.65535 | 30.0188-30.FFFF | Reserved | Read as zeroes, writes have no effect |

Figure 22:
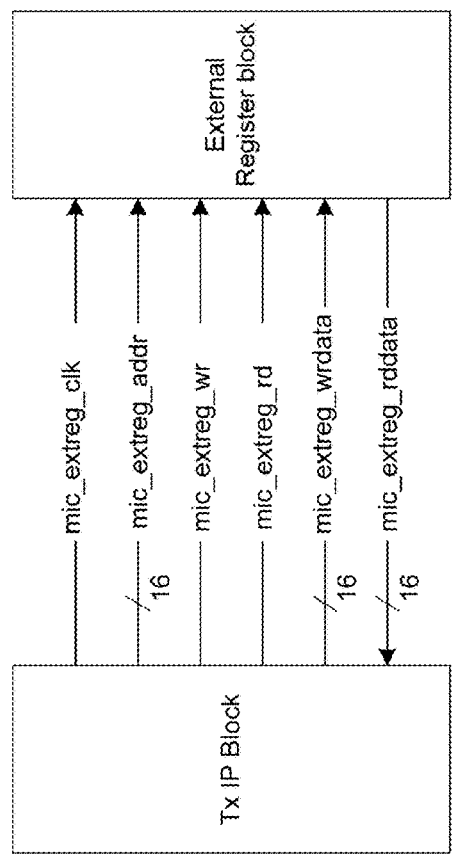
FIG. 22 is a simplified diagram illustrating registers used between Tx IP block and external register block according to embodiments of the present invention.

As an example, an MMD 31 Register Interface is provided for configuration and/or other functions. The MMD 31 Registers are allocated for the configuration and status information of the registers external to the Tx IP design, but within the Tx Chip that includes the Tx IP. These registers are to be implemented outside the IP. The IP will provide the clock, register address, register read and write strobe and the register write data. The external block will use these to interface to the registers and provide the read data back to the IP as shown FIG. 22.

An overview of the registers for the particular MMD is specified in the table 13:

TABLE 13

MMD 31 Register Overview

| Register address | | Register name | Notes |
|---|---|---|---|
| Decimal | Hex | | |
| 31.0 | 31.0000 | Vendor Specific Device Control 1 | |
| 31.1 | 31.0001 | Reserved | Read as zeroes, writes have no effect |
| 31.2, 31.3 | 31.0002, 31.0003 | Vendor Specific device identifier | Tx Chip identifier, probably same as 30.2 and 30.3 |
| 31.4 | 31.0004 | Reserved | Read as zeroes, writes have no effect |
| 31.5, 31.6 | 31.0005, 31.0006 | Devices in Package registers | Vendor specific device 2 present bits |
| 31.7 | 31.0007 | Reserved | Read as zeroes, writes have no effect |
| 31.8 | 31.0008 | Vendor Specific Status register | |
| 31.9-31.13 | 31.0009-31.000D | Reserved | Read as zeroes, writes have no effect |
| 31.14, 31.15 | 31.000E-31.000F | Vendor Specific package identifier | Read as zeroes, writes have no effect |
| 31.16-31.65535 | 31.0010-31.FFFF | External registers | ~64k 16b registers |

The MDIO/I2C interface is given in the table 14 below:

TABLE 14

MDIO/I2C Interface Description

| Signal Name | Direction | Width | Reference Clock | Description |
|---|---|---|---|---|
| Controller interface | | | | |
| mic_mdio_in | Input | 1 | mic_mdc | MDIO Input data |
| mic_i2csel | Input | 1 | Register clock | I2C Select pin, 1-I2C interface, 0-MDIO interface |

TABLE 14-continued

MDIO/I2C Interface Description

| Signal Name | Direction | Width | Reference Clock | Description |
|---|---|---|---|---|
| mic_mdio_out | output | 1 | mic_mdc | MDIO output data |
| mic_mdio_out_en | Output | 1 | mic_mdc | MDIO output data enable |
| mic_phyaddr | Input | 5 | mic_mdc | Phy Address pins |
| mic_extreg_addr | Output | 16 | mic_mdc | 16b Register address |
| mic_extreg_wr | Output | 1 | mic_mdc | 1b register write |
| mic_extreg_rd | Output | 1 | mic_mdc | 1b register read |
| mic_extreg_wrdata | Output | 16 | mic_mdc | 16b register write data |
| mic_extreg_rddata | Input | 16 | mic_mdc | 16b register read data |
| mic_control | Output | N | mic_mdc | N bit control for IP blocks |
| mic_status | Input | M | mic_mdc | M bit status from the IP block |
| Test Interface | | | | |
| tx_scan_mode | Input | 1 | Test clock | Scan mode |
| tx_scan_in | Input | X | Test clock | Scan in |
| tx_scan_en | Input | 1 | Test clock | Scan enable |
| mic_scan_out | Output | X | Test clock | Scan out |
| Clock/Reset interface | | | | |
| mic_mdc | Input | 1 | | MDC clock |
| mic_clk10m | Input | 1 | | 10 Mhz clock for I2C |
| mic_reset_mdc_n | Input | 1 | mic_mdc | Active low reset synchronized to mic_mdc |
| mic_reset_clk10m_n | Input | 1 | mic_clk10m | Active low reset synchronized to clk10m |

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication apparatus comprising:
   a plurality of communication lanes, each of communication lanes being configured to receive data streams in 25 Gbps, 40 Gbps, 50 Gbps, and/or 100 Gbps modes;
   a plurality of de-skew compensators corresponding to the plurality of communication lanes, the plurality of de-skew compensators being configured to remove skews from the received data streams at a first clock rate;
   an alignment module being configured to generate an aligned data stream based on the de-skewed data streams from the plurality of de-skew compensators, the alignment module being configured to operate at a second clock rate, the aligned data stream comprising a first plurality of words, the first plurality of words being characterized by a first word length;
   a transcoder module being configured to generate alternating data streams based using the aligned data stream, the transcoder being configured to operate at a third clock rate, the alternating data streams comprising a second plurality of words, the second plurality of words being characterized by a second word length, the transcoder being operative in two or more modes;
   an FEC module being configured to encode the alternating data streams to generate a first encoded data stream and a second encoded data stream;
   a first gearbox being configured to process the first encoded data stream; and
   a second gearbox being configured to process the second encoded data stream.

2. The apparatus of claim 1 further comprising an alignment processing module for updating alignment markers in the aligned data stream.

3. The apparatus of claim 2 wherein the alignment processing module comprises an alignment marker mapper.

4. The apparatus of claim 1 wherein the transcoder is operative in 40 Gbps PAM-4 mode and 100 Gbps PAM-8 mode.

5. The apparatus of claim 4 wherein the transcoder processes input in every clock cycle when operating in the 100 Gbps PAM-8 mode.

6. The apparatus of claim 5 wherein the transcoder processes input in every four clock cycles when operating in the 40 Gbps PAM-4 mode.

7. The apparatus of claim 1 further comprising a pattern generator module coupled to the first gearbox.

8. The apparatus of claim 7 wherein the pattern generator module supports a plurality of PRBS patterns and inverse PRBS patterns.

9. The apparatus of claim 7 wherein the pattern generator supports a customer stored in a predetermined memory location.

10. The apparatus of claim 1 wherein the alignment module is configured to insert alignment markers at predetermined locations.

11. The apparatus of claim 1 wherein the transcoder concatenates a predetermined number of words from the aligned data stream.

12. The apparatus of claim 1 wherein FEC module operates at the third clock rate.

13. The apparatus of claim 1 wherein the first gearbox and the second gearbox operates at the third clock rate.

14. The apparatus of claim 1 further a first grey mapping module for processing output of the first gear box, the first grey mapping module being configured to operate at a fourth clock rate.

15. The apparatus of claim 1 further comprising a plurality of pseudo random bit sequence (PRBS) checker configured to check the data signal streams.

16. The apparatus of claim 1 wherein the plurality of de-skew compensators is configured to provide a protocol lock finite state machine.

17. The apparatus of claim 1 wherein the first gearbox is configured to divide the first encoded data stream into two data streams.

18. The apparatus of claim 1 further comprising a first MUX device coupled to outputs of the first gearbox, the MUX device being configured to select outputs based on at least a PRBS mode.

19. A communication apparatus comprising:
a plurality of communication lanes, each of communication lanes being configured to receive data signal streams in 25 Gbps, 40 Gbps, 50 Gbps, and/or 100 Gbps modes;
a plurality of de-skew compensators corresponding to the plurality of communication lanes, the plurality of de-skew compensators being configured to removing skews from the received data streams at a first clock rate;
an alignment module being configured to generate an aligned data stream based on the de-skewed data streams from the plurality of de-skew compensators, the alignment module being configured to operate at a second clock rate, the aligned data stream comprising a first plurality of words, the first plurality of words being characterized by a first word length;
a transcoder module being configured to generate alternating data streams based using the aligned data stream, the transcoder being configured to operate at a third clock rate, the alternating data streams comprising a second plurality of words, the second plurality of words being characterized by a second word length, the transcoder being operative in two or more modes;
an FEC module being configured to encode the alternating data streams to generate a first encoded data stream and a second encoded data stream;
a first gearbox being configured to process the first encoded data stream and divide the first encoded data stream into two data streams; and
a first MUX device coupled to the first gearbox, the first MUX device being configured to select between the two data streams based on a PRBS mode.

20. A communication apparatus comprising:
a plurality of communication lanes, each of communication lanes being configured to receive data signal streams in 25 Gbps, 40 Gbps, 50 Gbps, and/or 100 Gbps modes;
a plurality of de-skew compensators corresponding to the plurality of communication lanes, the plurality of de-skew compensators being configured to removing skews from the received data streams at a first clock rate;
an alignment module being configured to generate an aligned data stream based on the de-skewed data streams from the plurality of de-skew compensators, the alignment module being configured to operate at a second clock rate, the aligned data stream comprising a first plurality of words, the first plurality of words being characterized by a first word length;
a transcoder module being configured to generate alternating data streams based using the aligned data stream, the transcoder being configured to operate at a third clock rate, the alternating data streams comprising a second plurality of words, the second plurality of words being characterized by a second word length, the transcoder being operative in two or more modes;
an FEC module being configured to encode the alternating data streams to generate a first encoded data stream and a second encoded data stream;
a first gearbox being configured to process the first encoded data stream and divide the first encoded data stream into two data streams; and
a pattern generator coupled to the first gearbox and being configured to generate patterns inserted into the two data streams.

* * * * *